US009862814B2

(12) United States Patent
Sakaki et al.

(10) Patent No.: US 9,862,814 B2
(45) Date of Patent: Jan. 9, 2018

(54) PNEUMATIC TIRE, STUDLESS TIRE, METHOD FOR MANUFACTURING PNEUMATIC TIRE, AND METHOD FOR MANUFACTURING STUDLESS TIRE

(71) Applicant: SUMITOMO RUBBER INDUSTRIES, LTD., Kobe-shi, Hyogo (JP)

(72) Inventors: Toshiaki Sakaki, Kobe (JP); Yuka Yokoyama, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 97 days.

(21) Appl. No.: 14/888,285

(22) PCT Filed: May 12, 2014

(86) PCT No.: PCT/JP2014/062597
§ 371 (c)(1),
(2) Date: Oct. 30, 2015

(87) PCT Pub. No.: WO2014/188901
PCT Pub. Date: Nov. 27, 2014

(65) Prior Publication Data

US 2016/0075863 A1 Mar. 17, 2016

(30) Foreign Application Priority Data

| | | |
|---|---|---|
| May 23, 2013 | (JP) | 2013-108965 |
| May 23, 2013 | (JP) | 2013-108966 |
| May 23, 2013 | (JP) | 2013-108967 |
| May 23, 2013 | (JP) | 2013-108969 |
| May 23, 2013 | (JP) | 2013-108970 |
| May 23, 2013 | (JP) | 2013-108971 |
| May 23, 2013 | (JP) | 2013-108972 |
| May 23, 2013 | (JP) | 2013-108973 |
| May 23, 2013 | (JP) | 2013-108974 |
| May 23, 2013 | (JP) | 2013-108975 |

(51) Int. Cl.

| | |
|---|---|
| ***C08L 7/00*** | (2006.01) |
| ***B60C 1/00*** | (2006.01) |
| ***C08C 1/04*** | (2006.01) |
| ***C08L 15/00*** | (2006.01) |
| ***C08K 3/04*** | (2006.01) |
| ***C08L 9/00*** | (2006.01) |
| ***C08L 9/06*** | (2006.01) |
| ***C08L 19/00*** | (2006.01) |

(52) U.S. Cl.
CPC .................. *C08L 7/00* (2013.01); *B60C 1/00* (2013.01); *C08C 1/04* (2013.01); *C08K 3/04* (2013.01); *C08L 9/00* (2013.01); *C08L 9/06* (2013.01); *C08L 15/00* (2013.01); *C08L 19/006* (2013.01); *C08L 2205/02* (2013.01)

(58) Field of Classification Search
CPC .... C08K 3/36; C08K 5/548; C08K 2201/006; C08L 7/00; C08L 9/06; C08L 2205/02; B60C 1/00; B60C 1/0016; B60C 1/04; B60C 11/0008; B60C 11/005; B60C 2011/0016; C08C 1/04; C08C 3/02; Y02T 10/862
See application file for complete search history.

(56) References Cited

U.S. PATENT DOCUMENTS

| | | | | |
|---|---|---|---|---|
| 2011/0178235 A1* | 7/2011 | Sugimoto | B60C 1/0008 524/575.5 |
| 2011/0253285 A1 | 10/2011 | Ichikawa et al. | |
| 2011/0294949 A1* | 12/2011 | Sakaki | C08K 3/04 524/572 |
| 2012/0184671 A1* | 7/2012 | Sakaki | B60C 1/00 524/572 |
| 2015/0291765 A1 | 10/2015 | Sasaki et al. | |

FOREIGN PATENT DOCUMENTS

| | | |
|---|---|---|
| CN | 102245644 A | 11/2011 |
| CN | 102585041 A | 7/2012 |

(Continued)

OTHER PUBLICATIONS

Amnuaypornsri et al., Highly Purified Natural Rubber by Saponificaion of Latex: Analysis of Green and Cured Properties, Journal of Applied Polymer Science, vol. 118, 2010 (published online Jul. 14, 2010), pp. 3524-3531.
Kawahara et al., "Removal of Proteins from Natural Rubber with Urea", Polymers for Advanced Technologies, vol. 15, 2004, Published online in Wiley InterScience (www.interscience.wiley.com), pp. 181-184.

*Primary Examiner* — Robert Jones, Jr.
(74) *Attorney, Agent, or Firm* — Birch, Stewart, Kolasch & Birch, LLP

(57) ABSTRACT

Provided are pneumatic tires or studless winter tires that achieve a balanced improvement in fuel economy, reinforcing properties (flex crack growth resistance, abrasion resistance, tensile strength, adhesive strength, resistance to air permeation), grip performance (wet-grip performance, performance on snow and ice), handling stability, and heat aging resistance, and methods for producing such a pneumatic tire or studless winter tire. The present invention relates to a pneumatic tire including at least one component selected from the group consisting of a sidewall, a base tread, a bead apex, a clinch apex, an innerliner, and an undertread, each of which is formed from a rubber composition that contains a highly purified, modified natural rubber whose pH is adjusted to 2 to 7, and carbon black and/or a white filler.

14 Claims, No Drawings

(56) References Cited

FOREIGN PATENT DOCUMENTS

| | | | |
|---|---|---|---|
| CN | 104854136 | A | 8/2015 |
| EP | 2 896 633 | A1 | 7/2015 |
| JP | 8-12814 | A | 1/1996 |
| JP | 11-12306 | A | 1/1999 |
| JP | 3294901 | B2 | 6/2002 |
| JP | 2004-250546 | A | 9/2004 |
| JP | 2005-82622 | A | 3/2005 |
| JP | 2006-213752 | A | 8/2006 |
| JP | 2006-213753 | A | 8/2006 |
| JP | 2012-116970 | A | 6/2012 |
| JP | 2012-149134 | A | 8/2012 |
| JP | 2012-241066 | A | 12/2012 |

* cited by examiner

PNEUMATIC TIRE, STUDLESS TIRE, METHOD FOR MANUFACTURING PNEUMATIC TIRE, AND METHOD FOR MANUFACTURING STUDLESS TIRE

TECHNICAL FIELD

The present invention relates to pneumatic tires including a specific component and studless winter tires formed from a rubber composition for studless winter tires. The present invention also relates to methods for producing such a pneumatic tire or studless winter tire.

BACKGROUND ART

Along with a greater demand for high fuel economy tires, improvements in the fuel economy of the tread, which constitutes a large part of a tire, and of other tire components such as the sidewall or base tread have recently been demanded. Known approaches to improve the fuel economy include the use of low reinforcing filler, the use of a smaller amount of filler, or the use of silica filler. However, since these approaches reduce reinforcing properties, it is generally difficult to simultaneously ensure fuel economy and reinforcing properties.

In view of fuel economy and environmental concerns, natural rubber is widely used. Natural rubber has a higher Mooney viscosity than other synthetic rubbers and is poor in processability. Usually, natural rubber is mixed with a peptizer and then masticated to reduce the Mooney viscosity before use, which results in poor productivity. Further, the mastication breaks the molecular chains of natural rubber and the resultant natural rubber unfortunately loses high-molecular-weight polymer characteristics that natural rubber originally has, such as good abrasion resistance, good fuel economy, and high rubber strength.

A report teaches that the processability of natural rubber can be improved by removing proteins from latex. For example, a method of aging with a proteolytic enzyme and a surfactant, a method of immersing a solid natural rubber swollen with a solvent in an alkali hydroxide, a method of adding a phosphate and then removing magnesium phosphate, and a method of washing with a surfactant are disclosed (Patent Literatures 1 to 5). Unfortunately, these methods fail to sufficiently remove proteins and hardly remove phospholipids and the like. Accordingly, there still remains room for improvement in fuel economy.

Another problem is that, although common natural rubber is not degraded under aging conditions at 80° C. for about 18 hours, degradation is observed when modified natural rubber from which proteins and the like have been highly removed is exposed to the same conditions, indicating that the modified natural rubber is inferior in heat aging resistance. As described above, it is generally difficult to achieve a balanced improvement in the fuel economy, reinforcing properties, and heat aging resistance of tires. Thus, improvements are desired. Furthermore, improvements in grip performance (wet-grip performance, performance on snow and ice), handling stability and the like are constantly needed for safety reasons.

CITATION LIST

Patent Literature

Patent Literature 1: JP H08-12814 A
Patent Literature 2: JP 2005-82622 A

Patent Literature 3: JP H11-12306 A
Patent Literature 4: JP 2004-250546 A
Patent Literature 5: JP 3294901 B

SUMMARY OF INVENTION

Technical Problem

The present invention aims to solve the above problems and provide pneumatic tires or studless winter tires that achieve a balanced improvement in fuel economy, reinforcing properties (flex crack growth resistance, abrasion resistance, tensile strength, adhesive strength, resistance to air permeation), grip performance (wet-grip performance, performance on snow and ice), handling stability, and heat aging resistance, and further provide methods for producing such a pneumatic tire or studless Winter tire.

Solution to Problem

One aspect of the present invention relates to a pneumatic tire, including at least one component selected from the group consisting of a sidewall, a base tread, a bead apex, a clinch apex, an innerliner, and an undertread, each of which is formed from a rubber composition that contains a highly purified, modified natural rubber whose pH is adjusted to 2 to 7, and at least one of carbon black or a white filler.

Another aspect of the present invention relates to a pneumatic tire, including at least one of a breaker topping or a ply topping, each of which is formed from a rubber composition that contains a highly purified, modified natural rubber whose pH is adjusted to 2 to 7 and carbon black.

Another aspect of the present invention relates to a pneumatic tire, including a tread, the tread being formed from a rubber composition that contains a highly purified, modified natural rubber whose pH is adjusted to 2 to 7, styrene-butadiene rubber, and a white filler.

Preferably, the modified natural rubber is obtained by removing non-rubber components in natural rubber, followed by treatment with an acidic compound, and the modified natural rubber has a pH of 2 to 7.

Preferably, the modified natural rubber is obtained by washing a saponified natural rubber latex and treating the washed saponified natural rubber latex with an acidic compound, and the modified natural rubber has a pH of 2 to 7.

Preferably, the modified natural rubber is obtained by washing a deproteinized natural rubber latex and treating the washed deproteinized natural rubber latex with an acidic compound, and the modified natural rubber has a pH of 2 to 7.

Preferably, the modified natural rubber has a phosphorus content of 200 ppm or less.

Preferably, the modified natural rubber has a nitrogen content of 0.15% by mass or less.

Preferably, the modified natural rubber has a heat aging resistance index of 75 to 120%, the heat aging resistance index being defined by the following equation based on Mooney viscosities ML (1+4) at 130° C. measured in conformity with JIS K 6300:2001-1:

Heat aging resistance index (%)=(Mooney viscosity of the modified natural rubber measured after heat treatment at 80° C. for 18 hours)/(Mooney viscosity of the modified natural rubber before the heat treatment)×100.

Another aspect of the present invention relates to a method for producing the pneumatic tire, including:

step 1-1 of saponifying natural rubber latex;

step 1-2 of coagulating the saponified natural rubber latex obtained in step 1-1, treating the coagulated rubber with a basic compound, and washing the treated coagulated rubber;

step 1-3 of treating the washed coagulated rubber with an acidic compound to adjust the pH of the entire rubber to 2 to 7; and step 1-4 of kneading the modified natural rubber obtained in step 1-3.

Another aspect of the present invention relates to a method for producing the pneumatic tire, including:

step 2-1 of deproteinizing natural rubber latex;

step 2-2 of coagulating the deproteinized natural rubber latex obtained in step 2-1, and washing the coagulated rubber;

step 2-3 of treating the washed coagulated rubber with an acidic compound to adjust the pH of the entire rubber to 2 to 7; and step 2-4 of kneading the modified natural rubber obtained in step 2-3.

Another aspect of the present invention relates to a studless winter tire, formed from a rubber composition that contains a highly purified, modified natural rubber whose pH is adjusted to 2 to 7, and at least one of carbon black or a white filler.

Preferably, the modified natural rubber is obtained by removing non-rubber components in natural rubber, followed by treatment with an acidic compound, and the modified natural rubber has a pH of 2 to 7.

Preferably, the modified natural rubber is obtained by washing a saponified natural rubber latex and treating the washed saponified natural rubber latex with an acidic compound, and the modified natural rubber has a pH of 2 to 7.

Preferably, the modified natural rubber is obtained by washing a deproteinized natural rubber latex and treating the washed deproteinized natural rubber latex with an acidic compound, and the modified natural rubber has a pH of 2 to 7.

Advantageous Effects of Invention

The first aspect of the present invention is a pneumatic tire including at least one component selected from the group consisting of a sidewall, a base tread, a bead apex, a clinch apex, an innerliner, and an undertread, formed from a rubber composition that contains a highly purified, modified natural rubber whose pH is adjusted to 2 to 7, and carbon black and/or a white filler. Such a tire achieves a balanced improvement in fuel economy, reinforcing properties such as flex crack growth resistance, handling stability, and heat aging resistance.

The second aspect of the present invention is a pneumatic tire including a breaker topping and/or a ply topping formed from a rubber composition that contains a highly purified, modified natural rubber whose pH is adjusted to 2 to 7 and carbon black. Such a tire achieves a balanced improvement in fuel economy, reinforcing properties, and heat aging resistance.

The third aspect of the present invention is a pneumatic tire including a tread formed from a rubber composition that contains a highly purified, modified natural rubber whose pH is adjusted to 2 to 7, styrene-butadiene rubber, and a white filler. Such a tire achieves a balanced improvement in fuel economy, reinforcing properties, wet-grip performance, and heat aging resistance.

The fourth aspect of the present invention is a studless winter tire formed from a rubber composition that contains a highly purified, modified natural rubber whose pH is adjusted to 2 to 7, and carbon black and/or a white filler. Such a tire achieves a balanced improvement in fuel economy, reinforcing properties, performance on snow and ice, and heat aging resistance.

DESCRIPTION OF EMBODIMENTS

The pneumatic tire according to the first aspect of the present invention includes at least one component selected from the group consisting of a sidewall, a base tread, a bead apex, a clinch apex, an innerliner, and an undertread, formed from a rubber composition that contains a highly purified, modified natural rubber whose pH is adjusted to 2 to 7, and carbon black and/or a white filler.

The pneumatic tire according to the second aspect of the present invention includes a breaker topping and/or a ply topping formed from a rubber composition that contains a highly purified, modified natural rubber whose pH is adjusted to 2 to 7 and carbon black.

The pneumatic tire according to the third aspect of the present invention includes a tread formed from a rubber composition that contains a highly purified, modified natural rubber whose pH is adjusted to 2 to 7, styrene-butadiene rubber, and a white filler.

The studless winter tire according to the fourth aspect of the present invention is formed from a rubber composition that contains a highly purified, modified natural rubber whose pH is adjusted to 2 to 7, and carbon black and/or a white filler.

The modified natural rubber used commonly in the first, second, third, and fourth aspects of the present invention will be described below.

The modified natural rubber is highly purified and is adjusted to a pH of 2 to 7.

The modified natural rubber has been highly purified by removing non-rubber components such as proteins and phospholipids. Further, the pH of the modified natural rubber is controlled to an appropriate value. Thus, its properties including fuel economy, reinforcing properties (flex crack growth resistance, abrasion resistance, tensile strength, adhesive strength, resistance to air permeation), grip performance (wet-grip performance, performance on snow and ice), and handling stability are improved. Moreover, rubber is more likely to be degraded when non-rubber components are removed therefrom or when the rubber becomes basic or highly acidic. However, by adjusting the pH of rubber within a predetermined range, the reduction of the molecular weight during storage is inhibited, resulting in good heat aging resistance. Further, the modified natural rubber strongly binds to the filler added thereto, which results in markedly improved flex crack growth resistance. Therefore, the balance of fuel economy, heat aging resistance, and the above-described properties is markedly improved.

The term "highly purified" herein means that impurities other than natural polyisoprenoid components, such as phospholipids and proteins are removed. The structure of natural rubber is like that in which an isoprenoid component is covered with these impurity components. By removing the impurity components, the structure of the isoprenoid component is altered so that the interactions with compounding agents are changed to reduce energy loss, and durability is enhanced, which is considered to allow a better quality rubber composition to be produced.

The highly purified, modified natural rubber whose pH is adjusted to 2 to 7 may be any modified natural rubber which has been highly purified by reducing the amount of non-rubber components, and whose pH is 2 to 7. Specific examples include: (1) a modified natural rubber which is obtained by removing non-rubber components in natural rubber, followed by treatment with an acidic compound, and which has a pH of 2 to 7; (2) a modified natural rubber which is obtained by washing a saponified natural rubber latex and treating the washed saponified natural rubber latex with an acidic compound, and which has a pH of 2 to 7; and (3) a modified natural rubber which is obtained by washing a deproteinized natural rubber latex and treating the washed deproteinized natural rubber latex with an acidic compound, and which has a pH of 2 to 7.

As described above, the modified natural rubber can be prepared by, for example, methods of washing a saponified natural rubber latex or a deproteinized natural rubber latex with distilled water or the like and treating the washed latex with an acidic compound. It is essential to shift the pH to the acidic side and lower the pH relative to the pH of distilled water used in the water washing, by the treatment with an acidic compound. Distilled water usually does not have a pH of 7.00 but has a pH of approximately 5 to 6. If distilled water with such a pH value is used, it is then essential to reduce the pH to a pH value more acidic than 5-6 by the treatment with an acidic compound. Specifically, the treatment with an acidic compound is preferably carried out to reduce the pH to a value lower by 0.2 to 2 than the pH of water used in the water washing.

The modified natural rubber has a pH of 2 to 7, preferably 3 to 6, more preferably 4 to 6. When the pH of the modified natural rubber is adjusted within the range described above, the reduction of heat aging resistance is prevented and the balance of fuel economy, heat aging resistance, and the above-described properties is markedly improved. The pH of the modified natural rubber is determined by cutting the rubber into cubes with sides of 2 mm or less, immersing the cubes in distilled water and extracting them at 90° C. for 15 minutes under microwave irradiation, and then measuring the immersion water with a pH meter. Specifically, the pH is determined by a method described later in the examples. Regarding the extraction, one-hour extraction using an ultrasonic washing device or the like cannot completely extract water-soluble components from the inside of rubber and thus the pH of the inside of rubber cannot be accurately determined. In contrast, the present inventors have found out that extraction by the above-described technique can elucidate the real nature of rubber.

The modified natural rubber has been highly purified by any of various methods, such as those used for the rubbers (1) to (3). For example, the modified natural rubber preferably has a phosphorus content of 200 ppm or less, more preferably 150 ppm or less. If the phosphorus content is more than 200 ppm, the Mooney viscosity may increase during storage so that processability can be deteriorated, and the tan δ may increase so that fuel economy cannot be improved. The phosphorus content can be measured by conventional methods, such as ICP emission analysis. The phosphorus is presumably derived from phospholipids in natural rubber.

In the case of the modified natural rubber containing an artificial antioxidant, it preferably has a nitrogen content of 0.15% by mass or less, more preferably 0.1% by mass or less, as determined after it is immersed in acetone at room temperature (25° C.) for 48 hours. If the nitrogen content is more than 0.15% by mass, the Mooney viscosity may increase during storage so that processability can be deteriorated, and the effect of improving fuel economy may be insufficiently produced. Highly purified natural rubber is free of natural antioxidant components that natural rubber is thought to contain by nature, and thus it may deteriorate during long-term storage. To address this problem, artificial antioxidants may be added. The nitrogen content is measured after artificial antioxidants in the rubber are removed by extraction with acetone. The nitrogen content can be measured by conventional methods, such as the Kjeldahl method or the use of a trace nitrogen analyzer. The nitrogen is derived from proteins and amino acids.

The modified natural rubber preferably has a Mooney viscosity ML (1+4) at 130° C. of 75 or less, more preferably 40 to 75, still more preferably 45 to 75, particularly preferably 50 to 70, most preferably 55 to 65, as measured in conformity with JIS K 6300:2001-1. The modified natural rubber having a Mooney viscosity of 75 or less does not need mastication which is usually necessary before kneading of the rubber. Thus, such a modified natural rubber prepared without the mastication process can be suitably used as a compounding material for preparing rubber compositions. In contrast, the modified natural rubber having a Mooney viscosity of more than 75 needs mastication before use, which tends to lead to problems such as the need of dedicated equipment, a loss of electricity or thermal energy, and the like.

The modified natural rubber preferably has a heat aging resistance index of 75 to 120%, wherein the heat aging resistance index is defined by the following equation based on Mooney viscosities ML (1+4) at 130° C. as described above:

Heat aging resistance index (%)=(Mooney viscosity of the modified natural rubber measured after heat treatment at 80° C. for 18 hours)/(Mooney viscosity of the modified natural rubber before the heat treatment)×100.

The heat aging resistance index defined by the equation is more preferably 80 to 115%, still more preferably 85 to 110%. Although various methods for evaluating heat aging resistance of rubber are reported, heat aging resistance, such as during the production or service of tires, can be accurately evaluated by measuring the rate of change in the Mooney viscosity ML (1+4) at 130° C. between before and after heat treatment at 80° C. for 18 hours. When the heat aging resistance index falls within the range described above, excellent heat aging resistance is provided and the balance of fuel economy, heat aging resistance, and the above-described properties is markedly improved.

The highly purified, modified natural rubber whose pH is adjusted to 2 to 7, such as the rubber (1) to (3), may be prepared by, for example, a production method 1 or a production method 2. The production method 1 includes: step 1-1 of saponifying natural rubber latex; step 1-2 of washing the saponified natural rubber latex; and step 1-3 of treating the latex with an acidic compound. The production method 2 includes: step 2-1 of deproteinizing natural rubber latex; step 2-2 of washing the deproteinized natural rubber latex; and step 2-3 of treating the latex with an acidic compound.

[Production Method 1]

(Step 1-1)

Step 1-1 includes saponifying natural rubber latex. This treatment decomposes phospholipids and proteins in the rubber, thereby providing a saponified natural rubber latex containing a reduced amount of non-rubber components.

Natural rubber latex is collected as sap of natural rubber trees such as hevea trees. It contains components including water, proteins, lipids, inorganic salts as well as a rubber component. The gel fraction in the rubber is considered to be derived from a complex of various impurities therein. In the present invention, the natural rubber latex to be used may be a raw latex (field latex) taken from hevea trees by tapping, or a concentrated latex (e.g. purified latex, high-ammonia latex prepared by adding ammonia in a conventional manner, and LATZ latex which is stabilized with zinc oxide, TMTD, and ammonia) concentrated by centrifugation or creaming.

The saponification may be suitably carried out by, for example, the methods disclosed in JP 2010-138359 A and JP 2010-174169 A. Specifically, the saponification may be carried out, for example, as follows.

The saponification may be carried out by adding an alkali and optionally a surfactant to natural rubber latex and leaving the mixture for a certain period of time at a predetermined temperature. Stirring or the like may be performed as needed.

The alkali to be used in the saponification is preferably, but not limited to, sodium hydroxide, potassium hydroxide, or the like. The surfactant is not particularly limited, and examples include known anionic surfactants, nonionic surfactants, and amphoteric surfactants, such as polyoxyethylene alkyl ether sulfates. Suitable are anionic surfactants such as polyoxyethylene alkyl ether sulfates because they allow saponification to be well achieved without solidifying rubber. In the saponification, the amounts of the alkali and the surfactant, and the temperature and duration of the saponification may be appropriately chosen.

(Step 1-2)

Step 1-2 includes washing the saponified natural rubber latex obtained in step 1-1. Non-rubber components such as proteins are removed by this treatment.

For example, step 1-2 may be carried out by coagulating the saponified natural rubber latex obtained in step 1-1 to produce a coagulated rubber, treating the coagulated rubber with a basic compound, and then washing the resultant rubber. Specifically, after a coagulated rubber is prepared, it is diluted with water to transfer the water-soluble components to the aqueous phase, and then water is removed, whereby non-rubber components can be removed. Further, the coagulated rubber is treated with a basic compound so that non-rubber components which have been trapped inside the rubber during the coagulation can be redissolved. Thus, non-rubber components such as proteins firmly attached inside the coagulated rubber can be removed.

An exemplary coagulation method may include adding an acid, such as formic acid, acetic acid, or sulfuric acid, to adjust the pH, and optionally further adding a polymer flocculant. This does not produce large coagula, but produces a particulate rubber having a diameter in the order of between not more than one to a few millimeters and 20 mm. Then, proteins and the like are sufficiently removed by the treatment with a basic compound. The pH is preferably adjusted within the range of 3.0 to 5.0, more preferably 3.5 to 4.5.

Examples of the polymer flocculant include cationic polymer flocculants such as poly(dimethylaminoethyl(meth)acrylate methyl chloride quaternary salt); anionic polymer flocculants such as poly(acrylates); nonionic polymer flocculants such as polyacrylamide; and amphoteric polymer flocculants such as a copolymer of a dimethylaminoethyl (meth)acrylate methyl chloride quaternary salt and an acrylate. The amount of the polymer flocculant may be appropriately chosen.

Then, the coagulated rubber thus obtained is treated with a basic compound. The basic compound is not particularly limited. Suitable are basic inorganic compounds because of their ability to remove proteins and the like.

Examples of the basic inorganic compound include metal hydroxides such as alkali metal hydroxides and alkaline earth metal hydroxides; metal carbonates such as alkali metal carbonates and alkaline earth metal carbonates; metal hydrogen carbonates such as alkali metal hydrogen carbonates; metal phosphates such as alkali metal phosphates; metal acetates such as alkali metal acetates; metal hydrides such as alkali metal hydrides; and ammonia.

Examples of alkali metal hydroxides include lithium hydroxide, sodium hydroxide, and potassium hydroxide. Examples of alkaline earth metal hydroxides include magnesium hydroxide, calcium hydroxide, and barium hydroxide. Examples of alkali metal carbonates include lithium carbonate, sodium carbonate, and potassium carbonate. Examples of alkaline earth metal carbonates include magnesium carbonate, calcium carbonate, and barium carbonate. Examples of alkali metal hydrogen carbonates include lithium hydrogen carbonate, sodium hydrogen carbonate, and potassium hydrogen carbonate. Examples of alkali metal phosphates include sodium phosphate and sodium hydrogen phosphate. Examples of alkali metal acetates include sodium acetate and potassium acetate. Examples of alkali metal hydrides include sodium hydride and potassium hydride.

Preferred among these are metal hydroxides, metal carbonates, metal hydrogen carbonates, metal phosphates, and ammonia; more preferred are alkali metal carbonates, alkali metal hydrogen carbonates, and ammonia; and still more preferred are sodium carbonate and sodium hydrogen carbonate. The basic compounds may be used alone or in combinations of two or more.

The coagulated rubber may be treated with a basic compound by any method that allows the coagulated rubber to be brought into contact with the basic compound. Examples include a method of immersing the coagulated rubber in an aqueous solution of the basic compound, and a method of spraying an aqueous solution of the basic compound onto the coagulated rubber. The aqueous solution of the basic compound can be prepared by diluting and dissolving the basic compound in water.

The amount of the basic compound is preferably 0.1% by mass or more, more preferably 0.3% by mass or more, based on 100% by mass of the aqueous solution. If the amount is less than 0.1% by mass, proteins may not be sufficiently removed. The amount of the basic compound is preferably 10% by mass or less, more preferably 5% by mass or less. If the amount is more than 10% by mass, in spite of such a large amount of the basic compound required, the amount of decomposed proteins tends not to be increased, thereby resulting in poor efficiency.

The aqueous solution of the basic compound preferably has a pH of 9 to 13. In view of treatment efficiency, it more preferably has a pH of 10 to 12.

The treatment temperature may be appropriately chosen, and it is preferably 10° C. to 50° C., more preferably 15° C. to 35° C. Moreover, the treatment duration is usually 1 minute or longer, preferably 10 minutes or longer, more preferably 30 minutes or longer. If the duration is shorter than 1 minute, the effects of the present invention may not be well achieved. Although the upper limit is not restricted, the duration is preferably 48 hours or shorter, more preferably 24 hours or shorter, still more preferably 16 hours or shorter, in view of productivity.

Washing is performed after the treatment with a basic compound. This treatment allows non-rubber components such as proteins which have been trapped inside the rubber during the coagulation to be sufficiently removed and, at the same time, allows basic compounds present inside the coagulated rubber as well as those on the surface to be sufficiently removed. In particular, the removal of basic compounds remaining in the entire rubber during the washing step permits the entire rubber to be sufficiently treated with an acidic compound as described later. Thus, the pH of not only the surface but also the inside of the rubber can be adjusted to 2 to 7.

The washing can be suitably carried out by methods that can sufficiently remove non-rubber components and basic compounds contained in the entire rubber. For example, the washing may be carried out by a method in which the rubber component is diluted and washed in water, followed by centrifugation or followed by standing to allow the rubber to float and then draining only the aqueous phase to collect the rubber component. The number of washing cycles may be arbitrarily chosen as long as the amounts of non-rubber components such as proteins and of the basic compound can be reduced to desired levels. In the case of repeating a washing cycle which consists of adding 1000 mL of water to each 300 g of dry rubber, stirring the mixture, and then removing water, the number of washing cycles is preferably 3 (3 cycles) or more, more preferably 5 (5 cycles) or more, still more preferably 7 (7 cycles) or more.

The washing is preferably performed until the rubber has a phosphorus content of 200 ppm or less and/or has a nitrogen content of 0.15% by mass or less. When the washing is carried out so that phospholipids and proteins are sufficiently removed, fuel economy, the above-described properties, and processability are improved.

(Step 1-3)

Step 1-3 includes treating the washed rubber obtained in step 1-2 with an acidic compound. This treatment adjusts the pH of the entire rubber to 2 to 7 as described above, thereby providing a modified natural rubber excellent in the above-described properties. Although heat aging resistance tends to be reduced by the treatment with a basic compound and the like, an additional treatment with an acidic compound prevents such a problem and thus provides good heat aging resistance.

Examples of the acidic compound include, but not limited to, inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, α-resorcylic acid, β-resorcylic acid, γ-resorcylic acid, gallic acid, phloroglycine, sulfosalicylic acid, ascorbic acid, erythorbic acid, and bisphenolic acids. Preferred among these are acetic acid, sulfuric acid, formic acid, and the like. These acidic compounds may be used alone or in combinations of two or more.

The coagulated rubber may be treated with an acid by any method that allows the coagulated rubber to be brought into contact with the acidic compound. Examples include a method of immersing the coagulated rubber in an aqueous solution of the acidic compound, and a method of spraying an aqueous solution of the acidic compound onto the coagulated rubber. The aqueous solution of the acidic compound can be prepared by diluting and dissolving the acidic compound in water.

Although the amount of the acidic compound based on 100% by mass of the aqueous solution is not particularly limited, the lower limit is preferably 0.1% by mass or more, more preferably 0.3% by mass or more, while the upper limit is preferably 15% by mass or less, more preferably 10% by mass or less, still more preferably 5% by mass or less. When the amount falls within the range described above, good heat aging resistance can be obtained.

The treatment temperature may be appropriately chosen and it is preferably 10° C. to 50° C., more preferably 15° C. to 35° C. Typically, the treatment duration is preferably 3 seconds or longer, more preferably 10 seconds or longer, still more preferably 30 seconds or longer. If the duration is shorter than 3 seconds, the rubber may not be sufficiently neutralized and thus the effects of the present invention may not be well achieved. Although the upper limit is not restricted, the duration is preferably 24 hours or shorter, more preferably 10 hours or shorter, still more preferably 5 hours or shorter, in view of productivity.

In the treatment such as immersion in an aqueous solution of the acidic compound, the pH is preferably adjusted to 6 or lower.

Such neutralization results in excellent heat aging resistance. The upper limit of the pH is more preferably 5 or lower, still more preferably 4.5 or lower. The lower limit of the pH is not particularly restricted, and it is preferably 1 or higher, more preferably 2 or higher, because too strong acidity may cause degradation of the rubber and may complicate the wastewater disposal, though depending on the duration of immersion. The immersing treatment may be carried out, for example, by leaving the coagulated rubber in an aqueous solution of the acidic compound.

After the above treatment, the compound used in the treatment with an acidic compound is removed, and then the treated coagulated rubber may appropriately be washed. The washing may be carried out in the same manner as described above. For example, the amount of non-rubber components may be further reduced and adjusted to desired levels by repeating washing. Moreover, the coagulated rubber obtained after the treatment with an acidic compound may be squeezed with, for example, a roll squeezer into a sheet shape. The additional step of squeezing the coagulated rubber allows the surface and inside of the coagulated rubber to have a uniform pH, and thus the resulting rubber has desired properties. After the washing and squeezing steps are performed as needed, the resultant rubber is milled on a creper and dried, whereby the modified natural rubber can be obtained. The drying may be carried out in any manner, such as by using a common drier for drying TSR, such as a trolley dryer, a vacuum dryer, an air dryer, or a drum dryer.

[Production Method 2]

(Step 2-1)

Step 2-1 includes deproteinizing natural rubber latex. This treatment provides a deproteinized natural rubber latex that is free of non-rubber components such as proteins. The natural rubber latex to be used in step 2-1 may be the same as described above.

The deproteinizing treatment may be carried out by any known method by which proteins can be removed. An exemplary method may include adding a proteolytic enzyme to natural rubber latex to decompose proteins.

The proteolytic enzyme to be used in the deproteinizing treatment may be, but is not limited to, any of bacteria-derived enzymes, mold-derived enzymes, and yeast-derived enzymes. Specifically, one or a combination of proteases, peptidases, cellulases, pectinases, lipases, esterases, amylases, and the like may be used.

The amount of the proteolytic enzyme to be added is preferably 0.005 parts by mass or more, more preferably 0.01 parts by mass or more, still more preferably 0.05 parts by mass or more, per 100 parts by mass of solids in the natural rubber latex. An amount of less than the lower limit may result in an insufficient proteolytic reaction.

A surfactant may also be added together with the proteolytic enzyme in the deproteinizing treatment. Examples of the surfactant include anionic surfactants, cationic surfactants, nonionic surfactants, and amphoteric surfactants.

(Step 2-2)

Step 2-2 includes washing the deproteinized natural rubber latex obtained in step 2-1. Non-rubber components such as proteins are removed by this treatment.

Step 2-2 may be carried out, for example, by coagulating the deproteinized natural rubber latex obtained in step 2-1 to produce a coagulated rubber, and washing the coagulated rubber. Thus, non-rubber components such as proteins firmly attached inside the coagulated rubber can be removed.

The coagulation may be carried out in the same manner as in step 1-2. Further, the treatment with a basic compound as described above may optionally be performed. After a coagulated rubber is prepared, washing is performed. This washing may be carried out in the same manner as in step 1-2, so that non-rubber components such as proteins and the basic compound can be removed. For the same reason as described above, the washing is preferably performed until the rubber has a phosphorus content of 200 ppm or less and/or has a nitrogen content of 0.15% by mass or less.

(Step 2-3)

Step 2-3 includes treating the washed rubber obtained in step 2-2 with an acidic compound. Not only the treatment with a basic compound but also the acid coagulation using a small amount of acid tend to reduce heat aging resistance due to the fact that a water extract of the finally obtained rubber shows alkalinity or neutrality. Enzymes having an optimum pH in an alkali region are usually used as the proteolytic enzyme because they suitably enable deproteinization. Such an enzymatic reaction is often carried out under alkaline conditions depending on the optimum pH. To adjust the pH of the entire final rubber to 2 to 7, natural rubber latex is preferably deproteinized at a pH of 8 to 11, more preferably a pH of 8.5 to 11, in step 2-1. The deproteinized latex is then solidified under acidic conditions in the coagulation process. When the solidified rubber was washed only with water, an extract of the rubber obtained in the extraction described later had a higher pH than the pH of the extracting solvent, and such a rubber showed a great reduction particularly in heat aging resistance. In contrast, when the solidified rubber is treated with an acidic compound, optionally after the treatment with a basic compound, the above problem can be prevented and good heat aging resistance can be obtained.

The same acidic compounds as mentioned in step 1-3 can be used. Moreover, the coagulated rubber may be treated with an acid by any method that allows the coagulated rubber to be brought into contact with the acidic compound. Examples include a method of immersing the coagulated rubber in an aqueous solution of the acidic compound, and a method of spraying an aqueous solution of the acidic compound onto the coagulated rubber. The aqueous solution of the acidic compound can be prepared by diluting and dissolving the acidic compound in water.

Although the amount of the acidic compound based on 100% by mass of the aqueous solution is not particularly limited, the lower limit is preferably 0.01% by mass or more, more preferably 0.03% by mass or more, while the upper limit is preferably 15% by mass or less, more preferably 10% by mass or less, still more preferably 5% by mass or less. When the amount falls within the range described above, good heat aging resistance can be obtained.

The temperature and duration for the treatment may be appropriately chosen. The treatment may be carried out at the same temperature as in step 1-3. Moreover, in the treatment such as immersion in an aqueous solution of the acidic compound, the pH is preferably adjusted to the same range as in step 1-3.

After the above treatment, the compound used in the treatment with an acidic compound is removed, and then the treated coagulated rubber may appropriately be washed. The washing may be carried out in the same manner as described above. For example, the amount of non-rubber components may be further reduced and adjusted to desired levels by repeating washing. After the completion of washing, the resultant rubber is dried, whereby the modified natural rubber can be obtained. The drying may be carried out in any manner, for example, by the above-described techniques.

The components included in the pneumatic tires according to the first, second, and third aspects will be described below.

<Sidewall>

In the rubber composition for sidewalls in the present invention, the amount of the modified natural rubber based on 100% by mass of the rubber component of the rubber composition is 5% by mass or more, preferably 20% by mass or more, more preferably 30% by mass or more. If the amount is less than 5% by mass, excellent fuel economy may not be obtained. The amount of the modified natural rubber is also preferably 80% by mass or less, more preferably 60% by mass or less, still more preferably 50% by mass or less. If the amount is more than 80% by mass, flex crack growth resistance may be reduced.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR).

In particular, BR is preferably added to achieve good flex crack growth resistance. In the case of rubber compounds containing BR together with a white filler such as silica, usually the filler is poorly dispersed, and thus it is difficult to obtain desired properties. In the present invention, in contrast, the use of the modified natural rubber enhances the interaction between the filler and the rubber component. Accordingly, the filler is better dispersed and fuel economy and flex crack growth resistance are improved. In addition, good processability is obtained.

The BR is not particularly limited, and may be any of those commonly used in the tire industry.

The BR preferably has a cis content of 70% by mass or more, more preferably 90% by mass or more, still more preferably 97% by mass or more.

The BR preferably has a molecular weight distribution (Mw/Mn) of 1.5 or more, more preferably 2.0 or more. If the Mw/Mn is less than 1.5, processability may be deteriorated.

The BR preferably has a Mw/Mn of 5.0 or less, more preferably 4.0 or less. If the Mw/Mn is more than 5.0, flex crack growth resistance tends to be deteriorated. The Mn and Mw values in the present invention are measured by GPC and calibrated with polystyrene standards.

From the standpoint of achieving required fuel economy and flex crack growth resistance, the amount of BR based on 100% by mass of the rubber component is preferably 30% by mass or more, more preferably 40% by mass or more, still more preferably 50% by mass or more. In view of processability, the amount of BR is preferably 90% by mass or less, more preferably 80% by mass or less, still more preferably 70% by mass or less.

The rubber composition in the present invention contains carbon black and/or a white filler. This produces a reinforcing effect.

The carbon black preferably has a nitrogen adsorption specific surface area ($N_2SA$) of 20 $m^2/g$ or more, more preferably 30 $m^2/g$ or more. The $N_2SA$ of carbon black is also preferably 200 $m^2/g$ or less, more preferably 150 $m^2/g$ or less, still more preferably 100 $m^2/g$ or less. The carbon black with a $N_2SA$ of less than 20 $m^2/g$ tends not to produce a sufficient reinforcing effect. The carbon black with a $N_2SA$ of more than 200 $m^2/g$ tends to lead to reduced fuel economy.

The nitrogen adsorption specific surface area of carbon black is determined according to the method A in JIS K 6217.

The amount of carbon black per 100 parts by mass of the rubber component is preferably 1 part by mass or more, more preferably 2 parts by mass or more. The amount of carbon black is preferably 150 parts by mass or less, more preferably 100 parts by mass or less. When the amount falls within the range described above, good fuel economy and good flex crack growth resistance can be obtained.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Silica is preferred in view of fuel economy.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 $m^2/g$ or more. If the $N_2SA$ is less than 40 $m^2/g$, tensile strength after vulcanization tends to be reduced. The $N_2SA$ of silica is also preferably 300 $m^2/g$ or less, more preferably 250 $m^2/g$ or less. If the $N_2SA$ is more than 300 $m^2/g$, low heat build-up properties and rubber processability tend to be reduced. The nitrogen adsorption specific surface area of silica is determined by the BET method in conformity with ASTM D3037-81.

The amount of silica per 100 parts by mass of the rubber component is preferably 10 parts by mass or more, more preferably 20 parts by mass or more. The amount of silica is also preferably 120 parts by mass or less, more preferably 100 parts by mass or less. When the amount of silica falls within the range described above, good fuel economy and good flex crack growth resistance can be obtained.

In the case of the rubber composition for sidewalls in the present invention containing silica, preferably it further contains a silane coupling agent. The silane coupling agent is not particularly limited, and examples include sulfide silane coupling agents such as bis(3-triethoxysilylpropyl) disulfide or bis(3-triethoxysilylpropyl)tetrasulfide; mercapto silane coupling agents such as 3-mercaptopropyltrimethoxysilane or 3-mercaptopropyltriethoxysilane; vinyl silane coupling agents such as vinyltriethoxysilane; aminosilane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is also preferably 20 parts by mass or less, more preferably 15 parts by mass or less, still more preferably 10 parts by mass or less. If the amount exceeds 20 parts by mass, the effect of enhancing dispersion of silica tends not to increase, while the cost tends to unnecessarily increase. In addition, scorch time tends to be reduced, thereby reducing processability during kneading and extrusion.

In the rubber composition for sidewalls in the present invention, the combined amount of carbon black and white filler per 100 parts by mass of the rubber component is preferably 5 parts by mass or more, more preferably 10 parts by mass or more, still more preferably 20 parts by mass or more. The combined amount is preferably 150 parts by mass or less, more preferably 100 parts by mass or less. When the combined amount falls within the range described above, good fuel economy and good flex crack growth resistance can be obtained.

The rubber composition preferably contains oil as a plasticizer. This makes it possible to adjust the hardness to an appropriately low level, providing good processability. Non-limiting examples of the oil include conventional oils such as process oils, e.g., paraffinic process oils, aromatic process oils, and naphthenic process oils, vegetable fats and oils, and mixtures of the foregoing.

The amount of oil per 100 parts by mass of the rubber component is preferably 1 part by mass or more, more preferably 2 parts by mass or more. The amount of oil is also preferably 15 parts by mass or less, more preferably 10 parts by mass or less. When the amount falls within the range described above, excellent fuel economy and excellent flex crack growth resistance can be obtained while good processability is provided.

In addition to the above materials, the rubber composition for sidewalls in the present invention may appropriately contain various materials commonly used in the tire industry, such as zinc oxide, stearic acid, various kinds of antioxidants, plasticizers excluding oil (e.g., wax), vulcanizing agents (e.g. sulfur, organic peroxides), and vulcanization accelerators (e.g. sulfenamide vulcanization accelerators, guanidine vulcanization accelerators).

The rubber composition for sidewalls in the present invention is used in sidewalls of tires.

<Base Tread>

In the rubber composition for base treads in the present invention, the amount of the modified natural rubber based on 100% by mass of the rubber component of the rubber composition is 5% by mass or more, preferably 30% by mass or more, more preferably 50% by mass or more, still more preferably 60% by mass or more. If the amount is less than 5% by mass, excellent fuel economy may not be obtained. The amount of the modified natural rubber is also preferably 90% by mass or less, more preferably 80% by mass or less, still more preferably 75% by mass or less. If the amount is more than 90% by mass, handling stability may be reduced.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR).

In particular, BR is preferably added to achieve good fuel economy and good handling stability. In the case of rubber compounds containing BR together with a white filler such as silica, usually the filler is poorly dispersed, and thus it is difficult to obtain desired properties. In the present invention, in contrast, the use of the modified natural rubber enhances the interaction between the filler and the rubber component. Accordingly, the filler is better dispersed and fuel economy and handling stability are improved. In addition, good processability is obtained.

The BR is not particularly limited, and may be any of those commonly used in the tire industry.

The BR preferably has a cis content of 70% by mass or more, more preferably 90% by mass or more, still more preferably 97% by mass or more.

The BR preferably has a Mooney viscosity ($ML_{1+4}$ (100° C.)) of 10 or more, more preferably 30 or more. If the Mooney viscosity is less than 10, filler dispersibility tends to be reduced. The Mooney viscosity is preferably 120 or less, more preferably 80 or less. If the Mooney viscosity is more than 120, compound scorch (discoloration) during extrusion processing may be caused.

From the standpoint of achieving required fuel economy and handling stability, the amount of BR based on 100% by mass of the rubber component is preferably 10% by mass or more, more preferably 20% by mass or more. In view of processability, the amount of BR is preferably 70% by mass or less, more preferably 50% by mass or less, still more preferably 40% by mass or less.

The rubber composition for base treads in the present invention preferably contains carbon black and/or a white filler. This produces a reinforcing effect.

The carbon black preferably has a nitrogen adsorption specific surface area ($N_2SA$) of 50 $m^2/g$ or more, more preferably 60 $m^2/g$ or more. The $N_2SA$ of carbon black is also preferably 200 $m^2/g$ or less, more preferably 180 $m^2/g$ or less, still more preferably 150 $m^2/g$ or less. The carbon black with a $N_2SA$ of less than 50 $m^2/g$ tends not to produce a sufficient reinforcing effect. The carbon black with a $N_2SA$ of more than 200 $m^2/g$ tends to lead to reduced fuel economy.

The nitrogen adsorption specific surface area of carbon black is determined according to the method A in JIS K 6217.

The amount of carbon black per 100 parts by mass of the rubber component is preferably 1 part by mass or more, more preferably 2 parts by mass or more. The amount of carbon black is preferably 150 parts by mass or less, more preferably 100 parts by mass or less. When the amount falls within the range described above, good fuel economy and good handling stability can be obtained.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Silica is preferred in view of fuel economy.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 $m^2/g$ or more, still more preferably 100 $m^2/g$ or more. If the $N_2SA$ is less than 40 $m^2/g$, tensile strength after vulcanization tends to be reduced. The $N_2SA$ of silica is also preferably 300 $m^2/g$ or less, more preferably 200 $m^2/g$ or less. If the $N_2SA$ is more than 300 $m^2/g$, low heat build-up properties and rubber processability tend to be reduced. The nitrogen adsorption specific surface area of silica is determined by the BET method in conformity with ASTM D3037-81.

The amount of silica per 100 parts by mass of the rubber component is preferably 10 parts by mass or more, more preferably 20 parts by mass or more. The amount of silica is also preferably 120 parts by mass or less, more preferably 100 parts by mass or less. When the amount falls within the range described above, good fuel economy and good handling stability can be obtained.

In the case of the rubber composition for base treads in the present invention containing silica, preferably it further contains a silane coupling agent. The silane coupling agent is not particularly limited, and the same silane coupling agents as mentioned for the rubber composition for sidewalls may be used.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is also preferably 20 parts by mass or less, more preferably 15 parts by mass or less, still more preferably 10 parts by mass or less. If the amount exceeds 20 parts by mass, the effect of enhancing dispersion of silica tends not to increase, while the cost tends to unnecessarily increase. In addition, scorch time tends to be reduced, thereby reducing processability during kneading and extrusion.

In the rubber composition for base treads in the present invention, the combined amount of carbon black and white filler per 100 parts by mass of the rubber component is preferably 5 parts by mass or more, more preferably 10 parts by mass or more, still more preferably 20 parts by mass or more. The combined amount is preferably 150 parts by mass or less, more preferably 100 parts by mass or less. When the combined amount falls within the range described above, good fuel economy and good handling stability can be obtained.

The rubber composition preferably contains oil as a plasticizer. This makes it possible to adjust the hardness to an appropriately low level, providing good processability. Non-limiting examples of the oil include conventional oils such as process oils, e.g., paraffinic process oils, aromatic process oils, and naphthenic process oils, vegetable fats and oils, and mixtures of the foregoing.

The amount of oil per 100 parts by mass of the rubber component is preferably 1 part by mass or more, more preferably 2 parts by mass or more. The amount of oil is also preferably 15 parts by mass or less, more preferably 10 parts by mass or less. When the amount falls within the range described above, excellent fuel economy and excellent handing stability can be obtained while good processability is provided.

In addition to the above materials, the rubber composition for base treads in the present invention may appropriately contain various materials commonly used in the tire industry, such as zinc oxide, stearic acid, various kinds of antioxidants, plasticizers excluding oil (e.g., wax), vulcanizing agents (e.g. sulfur, organic peroxides), and vulcanization accelerators (e.g. sulfenamide vulcanization accelerators, guanidine vulcanization accelerators).

The rubber composition for base treads in the present invention is used in base treads of tires. The term “base tread” refers to an inner layer of a multilayer tread. In the case of a tread formed of two layers (an outer surface layer (cap tread) and an inner surface layer (base tread)), it corresponds to the inner surface layer. Specifically, the base tread is a component shown in, for example, FIG. 1 of JP 2008-285628 A or FIG. 1 of JP 2008-303360 A.

<Bead Apex>

In the rubber composition for bead apexes in the present invention, the amount of the modified natural rubber based on 100% by mass of the rubber component of the rubber composition is 5% by mass or more, preferably 10% by mass or more, more preferably 30% by mass or more, still more preferably 50% by mass or more. If the amount is less than 5% by mass, excellent fuel economy or rubber strength may not be obtained. Moreover, the upper limit of the amount is not particularly restricted, but is preferably 90% by mass or less, more preferably 80% by mass or less.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). These may be used alone or in combinations of two or more. Among these, SBR is particularly preferred as it is cost advantageous and ensures adhesive properties to adjacent components.

The SBR is not particularly limited, and may be a solution-polymerized SBR (S-SBR), an emulsion-polymerized SBR (E-SBR), or the like.

The SBR preferably has a styrene content of 5% by mass or more, more preferably 10% by mass or more, still more preferably 20% by mass or more. If the styrene content is less than 5% by mass, sufficient rubber strength may not be obtained. The styrene content is also preferably 60% by mass or less, more preferably 50% by mass or less, still more preferably 30% by mass or less. If the styrene content is more than 60% by mass, excellent fuel economy may not be obtained. Herein, the styrene content of SBR is determined by $H^1$-NMR.

The SBR preferably has a Mooney viscosity ML (1+4) at 100° C. of 35 or more, more preferably 45 or more, still more preferably 50 or more. If the Mooney viscosity is less than 35, the unvulcanized rubber composition may have so low a viscosity that a proper thickness cannot be ensured after vulcanization. The Mooney viscosity is preferably 65 or less, more preferably 60 or less. If the Mooney viscosity is more than 65, the unvulcanized rubber composition may become so hard that it may be difficult to extrude the composition so as to give smooth edges. The Mooney viscosity of SBR is measured in conformity with ISO 289 or JIS K 6300.

The amount of SBR based on 100% by mass of the rubber component is preferably 5% by mass or more, more preferably 10% by mass or more, still more preferably 15% by mass or more. The amount of SBR is preferably 95% by mass or less, more preferably 60% by mass or less, still more preferably 55% by mass or less, particularly preferably 50% by mass or less. When the amount of SBR falls within the range described above, good fuel economy and good processability can be obtained.

The combined amount of the modified natural rubber and SBR based on 100% by mass of the rubber component is preferably 80% by mass or more, more preferably 100% by mass. When the combined amount falls within the range described above, excellent fuel economy, processability, and cost advantages can be obtained.

The rubber composition for bead apexes in the present invention contains carbon black and/or a white filler. This produces an excellent reinforcing effect.

The carbon black is not particularly limited, and may be GPF, FEF, HAF, ISAF, SAF, or the like. These carbon blacks may be used alone or in combinations of two or more.

The carbon black preferably has a nitrogen adsorption specific surface area ($N_2SA$) of 10 $m^2/g$ or more, more preferably 30 $m^2/g$ or more, still more preferably 50 $m^2/g$ or more. The $N_2SA$ of carbon black is also preferably 250 $m^2/g$ or less, more preferably 150 $m^2/g$ or less, still more preferably 100 $m^2/g$ or less. If the $N_2SA$ is less than 10 $m^2/g$, sufficient adhesion or rubber strength may not be obtained. If the $N_2SA$ is more than 250 $m^2/g$, the unvulcanized rubber composition tends to have a very high viscosity and thus deteriorated processability. In addition, fuel economy tends to be deteriorated.

The nitrogen adsorption specific surface area of carbon black is determined according to the method A in JIS K 6217.

When carbon black is used, the amount of carbon black per 100 parts by mass of the rubber component is preferably 5 parts by mass or more, more preferably 20 parts by mass or more, still more preferably 40 parts by mass or more. The amount of carbon black is preferably 100 parts by mass or less, more preferably 80 parts by mass or less, still more preferably 70 parts by mass or less. If the amount is less than 5 parts by mass, sufficient adhesion or rubber strength may not be obtained. If the amount is more than 100 parts by mass, dispersibility and processability tend to be deteriorated.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Among these, silica is preferred in view of fuel economy and preservation of petroleum resources.

When a white filler is used, the amount of white filler per 100 parts by mass of the rubber component is preferably 5 parts by mass or more, more preferably 20 parts by mass or more, still more preferably 35 parts by mass or more. If the amount is less than 5 parts by mass, the rubber is insufficiently reinforced, resulting in a durability problem. The amount of white filler is also preferably 100 parts by mass or less, more preferably 80 parts by mass or less, still more preferably 65 parts by mass or less. If the amount is more than 100 parts by mass, processability tends to be deteriorated.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 100 $m^2/g$ or more, more preferably 110 $m^2/g$ or more. The silica with a $N_2SA$ of less than 100 $m^2/g$ tends not to produce a sufficient reinforcing effect. The nitrogen adsorption specific surface area ($N_2SA$) is also preferably 300 $m^2/g$ or less, more preferably 280 $m^2/g$ or less, still more preferably 200 $m^2/g$ or less. The silica with a $N_2SA$ of more than 300 $m^2/g$ tends to disperse poorly, resulting in an increase in heat build-up. The $N_2SA$ of silica is determined by the BET method in conformity with ASTM D3037-81.

When silica is used, the amount of silica per 100 parts by mass of the rubber component is preferably 5 parts by mass or more, more preferably 20 parts by mass or more, still more preferably 35 parts by mass or more. If the amount is less than 5 parts by mass, the rubber is insufficiently reinforced, resulting in a durability problem. The amount of silica is also preferably 100 parts by mass or less, more preferably 80 parts by mass or less, still more preferably 65 parts by mass or less. If the amount is more than 100 parts by mass, processability tends to be deteriorated.

In the case of the rubber composition containing silica, preferably it contains a silane coupling agent for better dispersion of silica.

The silane coupling agent may be any of those conventionally used with silica. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl) trisulfide, bis(2-triethoxysilylethyl)trisulfide, bis(4-triethoxysilylbutyl)trisulfide, bis(3-trimethoxysilylpropyl) trisulfide, bis(2-trimethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, or 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, 2-mercaptoethyltriethoxysilane, or 3-octanoylthio-1-propyltriethoxysilane; vinyl silane coupling agents such as vinyltriethoxysilane or vinyltrimethoxysilane; amino silane coupling agents such as 3-aminopropyltriethoxysilane, 3-aminopropyltrimethoxysilane, 3-(2-aminoethyl)aminopropyltriethoxysilane, or 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, or γ-glycidoxypropylmethyldimethoxysilane; nitro silane coupling agents such as 3-nitropropyltrimethoxysilane or 3-nitropropyltriethoxysilane; and chloro silane coupling agents such as 3-chloropropyltrimethoxysilane, 3-chloropropyltriethoxysilane, 2-chloroethyltrimethoxysilane, or 2-chloroethyltriethoxysilane. Examples of commercially available products include those sold under the trade names Si69, Si75, and Si363 (all available from Degussa), and NXT, NXT-LV, NXTULV, and NXT-Z (all available from Momentive). These coupling agents may be used either each alone or in combinations of two or more thereof.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is preferably 20 parts by mass or less, more preferably 15 parts by mass or less, still more preferably 10 parts by mass or less. If the amount of silane coupling agent used exceeds 20 parts by mass, the effect of enhancing dispersion of silica tends not to increase, while the cost tends to unnecessarily increase. In addition, scorch time tends to be reduced, thereby reducing processability during kneading and extrusion.

In the rubber composition for bead apexes in the present invention, the combined amount of carbon black and white filler per 100 parts by mass of the rubber component is preferably 5 parts by mass or more, more preferably 10 parts by mass or more, still more preferably 20 parts by mass or more. The combined amount is preferably 150 parts by mass or less, more preferably 100 parts by mass or less. When the combined amount falls within the range described above, good fuel economy and good tensile strength can be obtained.

The rubber composition for bead apexes in the present invention preferably contains zinc oxide. The use of zinc oxide is effective in preventing reversion and accelerating vulcanization.

The amount of zinc oxide per 100 parts by mass of the rubber component is preferably 2 parts by mass or more, more preferably 3 parts by mass or more. The amount of zinc oxide is also preferably 15 parts by mass or less, more preferably 10 parts by mass or less. An amount of less than 2 parts by mass of zinc oxide may be less likely to produce a vulcanization accelerator effect. An amount of more than 15 parts by mass may reduce rubber strength.

In addition to the above materials, the rubber composition for bead apexes in the present invention may appropriately contain various materials commonly used in the tire industry, including, for example, resins, plasticizers such as oil, stearic acid, various kinds of antioxidants, vulcanizing agents such as sulfur, and vulcanization accelerators.

Examples of the resin include phenol-based resins and cresol-based resins, with phenol-based resins being preferred among these. Examples of phenol-based resins include phenol resins prepared by reacting a phenol with an aldehyde such as formaldehyde, acetaldehyde, or furfural, and modified phenol resins prepared by modification with cashew oil, tall oil, linseed oil, various animal and vegetable oils, unsaturated fatty acids, rosin, alkylbenzene resin, aniline, melamine, or the like. Among these, modified phenol resins are preferred, and cashew oil-modified phenol resins are particularly preferred, because they enhance the hardness.

When a resin is used, the amount of resin per 100 parts by mass of the rubber component is preferably 1 part by mass or more, more preferably 5 parts by mass or more, from the standpoint of providing a sufficient hardness. For excellent processability, the amount of resin is preferably 30 parts by mass or less, more preferably 20 parts by mass or less.

The rubber composition for bead apexes in the present invention is used in bead apexes which are to be positioned inside the tire clinch to extend radially outwardly from bead core. Specifically, the rubber composition can be used in components shown in FIGS. 1 to 3 of JP 2008-38140 A, FIG. 1 of JP 2004-339287 A, and the like.

<Clinch Apex>

In the rubber composition for clinch apexes in the present invention, the amount of the modified natural rubber based on 100% by mass of the rubber component of the rubber composition is 5% by mass or more, preferably 10% by mass or more, more preferably 30% by mass or more. If the amount is less than 5% by mass, excellent fuel economy or rubber strength may not be obtained. Moreover, the upper limit of the amount is not particularly restricted, but is preferably 90% by mass or less, more preferably 70% by mass or less.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). These may be used alone or in combinations of two or more. Among these, BR is particularly preferred in view of abrasion resistance and fuel economy.

Non-limiting examples of the BR include high-cis content BR such as BR1220 available from Zeon Corporation, and BR130B and BR150B available from Ube Industries, Ltd.; and BR containing syndiotactic polybutadiene crystals such as VCR412 and VCR617 available from Ube Industries, Ltd. For enhanced mechanical strength, the BR preferably has a cis content of 95% by mass or more.

The BR preferably has a vinyl content (1,2-butadiene unit content) of 35% by mass or less, more preferably 25% by mass or less, still more preferably 20% by mass or less, particularly preferably 10% by mass or less. If the vinyl content is more than 35% by mass, low heat build-up properties tend to be impaired. The lower limit of the vinyl content is not particularly restricted. The vinyl content of BR herein can be measured by infrared absorption spectrometry.

The amount of BR based on 100% by mass of the rubber component is 5% by mass or more, preferably 10% by mass or more, more preferably 30% by mass or more. The amount of BR is preferably 80% by mass or less, more preferably 70% by mass or less, still more preferably 60% by mass or less. If the amount is less than 5% by mass, abrasion resistance may be deteriorated. If the amount is more than 80% by mass, processability tends to be deteriorated.

The combined amount of the modified natural rubber and BR based on 100% by mass of the rubber component is preferably 80% by mass or more, more preferably 100% by mass. When the combined amount falls within the range described above, excellent fuel economy and excellent processability can be obtained.

The rubber composition for clinch apexes in the present invention contains carbon black and/or a white filler. This produces an excellent reinforcing effect.

The carbon black is not particularly limited, and may be GPF, FEF, HAF, ISAF, SAF, or the like. These carbon blacks may be used alone or in combinations of two or more.

The carbon black preferably has a nitrogen adsorption specific surface area ($N_2SA$) of 10 $m^2/g$ or more, more preferably 30 $m^2/g$ or more, still more preferably 50 $m^2/g$ or more. The $N_2SA$ of carbon black is also preferably 250 $m^2/g$ or less, more preferably 150 $m^2/g$ or less, still more preferably 100 $m^2/g$ or less. If the $N_2SA$ is less than 10 $m^2/g$, sufficient adhesion or rubber strength may not be obtained. If the $N_2SA$ is more than 250 $m^2/g$, the unvulcanized rubber composition tends to have a very high viscosity and thus deteriorated processability. In addition, fuel economy tends to be deteriorated.

The nitrogen adsorption specific surface area of carbon black is determined according to the method A in JIS K 6217.

When carbon black is used, the amount of carbon black per 100 parts by mass of the rubber component is preferably 5 parts by mass or more, more preferably 20 parts by mass or more, still more preferably 40 parts by mass or more. The amount of carbon black is preferably 100 parts by mass or less, more preferably 80 parts by mass or less, still more preferably 70 parts by mass or less. If the amount is less than 5 parts by mass, sufficient abrasion resistance, adhesion, or rubber strength may not be obtained. If the amount is more than 100 parts by mass, dispersibility and processability tend to be deteriorated.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Among these, silica is preferred in view of fuel economy and preservation of petroleum resources.

When a white filler is used, the amount of white filler per 100 parts by mass of the rubber component is preferably 5 parts by mass or more, more preferably 20 parts by mass or more, still more preferably 30 parts by mass or more. If the amount is less than 5 parts by mass, the rubber is insufficiently reinforced, resulting in a durability problem. The amount of white filler is also preferably 100 parts by mass or less, more preferably 70 parts by mass or less, still more preferably 50 parts by mass or less. If the amount is more than 100 parts by mass, processability tends to be deteriorated.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 100 $m^2/g$ or more, more preferably 110 $m^2/g$ or more. The silica with a $N_2SA$ of less than 100 $m^2/g$ tends not to produce a sufficient reinforcing effect. The nitrogen adsorption specific surface area ($N_2SA$) is also preferably 300 $m^2/g$ or less, more preferably 280 $m^2/g$ or less, still more preferably 200 $m^2/g$ or less. The silica with a $N_2SA$ of more than 300 $m^2/g$ tends to disperse poorly, resulting in an increase in heat build-up. The $N_2SA$ of silica is determined by the BET method in conformity with ASTM D3037-81.

The amount of silica per 100 parts by mass of the rubber component is preferably 5 parts by mass or more, more preferably 20 parts by mass or more, still more preferably 30 parts by mass or more. If the amount is less than 5 parts by mass, the rubber is insufficiently reinforced, resulting in a durability problem. The amount of silica is also preferably 100 parts by mass or less, more preferably 70 parts by mass or less, still more preferably 50 parts by mass or less. If the amount is more than 100 parts by mass, processability tends to be deteriorated.

In the case of the rubber composition containing silica, preferably it contains a silane coupling agent for better dispersion of silica. Examples of the silane coupling agent include those mentioned for the rubber composition for bead apexes. These coupling agents may be used either each alone or in combinations of two or more thereof.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is preferably 20 parts by mass or less, more preferably 15 parts by mass or less, still more preferably 10 parts by mass or less. If the amount of silane coupling agent used exceeds 20 parts by mass, the effect of enhancing dispersion of silica tends not to increase, while the cost tends to unnecessarily increase. In addition, scorch time tends to be reduced, thereby reducing processability during kneading and extrusion.

In the rubber composition for clinch apexes in the present invention, the combined amount of carbon black and white filler per 100 parts by mass of the rubber component is preferably 10 parts by mass or more, more preferably 30 parts by mass or more, still more preferably 40 parts by mass or more. The combined amount is also preferably 100 parts by mass or less, more preferably 80 parts by mass or less. When the combined amount falls within the range described above, the effects of the present invention can be sufficiently achieved.

In addition to the above materials, the rubber composition for clinch apexes in the present invention may appropriately contain various materials commonly used in the tire industry, including plasticizers such as oil or wax, stearic acid, various kinds of antioxidants, vulcanizing agents such as sulfur, and vulcanization accelerators.

The rubber composition for clinch apexes in the present invention is used in clinch apexes of tires. The term "clinch apex" refers to a rubber component positioned at the inner end of the sidewall. Specifically, the clinch apex is a component shown in, for example, FIG. 1 of JP 2008-75066 A or FIG. 1 of JP 2004-106796 A.

<Innerliner>

In the rubber composition for innerliners in the present invention, the amount of the modified natural rubber based on 100% by mass of the rubber component of the rubber composition is 5% by mass or more, preferably 10% by mass or more, more preferably 20% by mass or more. If the amount is less than 5% by mass, excellent fuel economy or rubber strength may not be obtained. Moreover, the upper limit of the amount is not particularly restricted, but is preferably 70% by mass or less, more preferably 50% by mass or less, still more preferably 40% by mass or less.

The rubber composition for innerliners in the present invention preferably contains a butyl-based rubber in order to achieve good resistance to air permeation.

Examples of the butyl-based rubber include halogenated butyl rubbers (X-IIR) such as brominated butyl rubber (Br-IIR) or chlorinated butyl rubber (Cl-IIR), and butyl rubber (IIR). These butyl-based rubbers may be used alone or in combinations of two or more. Among these, X-IIR such as Cl-IIR is preferred in view of low heat build-up properties.

When a butyl-based rubber is used, the amount of butyl-based rubber based on 100% by mass of the rubber component is preferably 50% by mass or more, more preferably 60% by mass or more, still more preferably 70% by mass or more. If the amount is less than 50% by mass, excellent resistance to air permeation may not be obtained. The amount of butyl-based rubber is also preferably 99% by mass or less, more preferably 90% by mass or less, still more preferably 80% by mass or less. If the amount is more than 99% by mass, good fuel economy may not be obtained.

In view of fuel economy and resource protection, the rubber composition for innerliners in the present invention preferably contains epoxidized natural rubber (ENR).

The ENR may be commercially available or may be prepared by epoxidizing NR. NR may be epoxidized by any method such as a chlorohydrin method, a direct oxidation method, a hydrogen peroxide method, an alkylhydroperoxide method, or a peracid method. The peracid method may be carried out, for example, by reacting a natural rubber emulsion with an organic peracid, such as peracetic acid or performic acid, as an epoxidizing agent.

The ENR preferably has an epoxidation degree of 1 to 85 moil. The ENR with an epoxidation degree of less than 1 mol % tends to be less effective in modifying the rubber composition. Moreover, if the epoxidation degree is more than 85 mol %, the polymers in the rubber composition tend to be gelled.

The epoxidation degree is defined as the ratio of the number of epoxidized carbon-carbon double bonds to the total number of carbon-carbon double bonds in the natural rubber before epoxidation, and it may be determined by, for example, titrimetric analysis or nuclear magnetic resonance (NMR) analysis.

When ENR is used, the amount of ENR based on 100% by mass of the rubber component is preferably 10% by mass or more, more preferably 20% by mass or more. The amount of ENR is also preferably 99% by mass or less, more preferably 90% by mass or less, still more preferably 70% by mass or less. If the amount is less than 10% by mass, the effect of dispersing filler in the rubber composition tends to be reduced. If the amount is more than 99% by mass, good processability or tensile strength may not be obtained.

Examples of usable rubber materials other than the modified natural rubber, butyl-based rubber, and ENR, include natural rubber (non-modified) (NR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). These may be used alone or in combinations of two or more.

The rubber composition for innerliners in the present invention contains carbon black and/or a white filler. This produces an excellent reinforcing effect. Particularly from the standpoint of sufficiently solving the problems that the present invention seeks to resolve, carbon black is suitable when a butyl-based rubber is used, or a white filler such as silica is suitable when ENR is used.

The carbon black is not particularly limited, and may be GPF, FEF, HAF, ISAF, SAF, or the like. These carbon blacks may be used alone or in combinations of two or more.

The carbon black preferably has a nitrogen adsorption specific surface area ($N_2SA$) of 10 $m^2/g$ or more, more preferably 20 $m^2/g$ or more, still more preferably 23 $m^2/g$ or more. The $N_2SA$ of carbon black is also preferably 250 $m^2/g$ or less, more preferably 100 $m^2/g$ or less, still more preferably 50 $m^2/g$ or less, particularly preferably 35 $m^2/g$ or less. If the $N_2SA$ is less than 10 $m^2/g$, sufficient adhesion or rubber strength may not be obtained. If the $N_2SA$ is more than 250 $m^2/g$, the unvulcanized rubber composition tends to have a very high viscosity and thus deteriorated processability. In addition, fuel economy tends to be deteriorated.

The nitrogen adsorption specific surface area of carbon black is determined according to the method A in JIS K 6217.

When carbon black is used, the amount of carbon black per 100 parts by mass of the rubber component is preferably 5 parts by mass or more, more preferably 20 parts by mass or more, still more preferably 30 parts by mass or more. The amount of carbon black is preferably 100 parts by mass or less, more preferably 80 parts by mass or less, still more preferably 60 parts by mass or less. If the amount is less than 5 parts by mass, sufficient abrasion resistance, adhesion, or rubber strength may not be obtained. If the amount is more than 100 parts by mass, dispersibility and processability tend to be deteriorated.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Among these, silica is preferred in view of fuel economy and preservation of petroleum resources.

When a white filler is used, the amount of white filler per 100 parts by mass of the rubber component is preferably 5 parts by mass or more, more preferably 20 parts by mass or more, still more preferably 30 parts by mass or more. If the amount is less than 5 parts by mass, the rubber is insufficiently reinforced, resulting in a durability problem. The amount of white filler is also preferably 100 parts by mass or less, more preferably 80 parts by mass or less, still more preferably 60 parts by mass or less. If the amount is more than 100 parts by mass, processability tends to be deteriorated.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 100 $m^2/g$ or more, more preferably 110 $m^2/g$ or more. The silica with a $N_2SA$ of less than 100 $m^2/g$ tends not to produce a sufficient reinforcing effect. The nitrogen adsorption specific surface area ($N_2SA$) is also preferably 300 $m^2/g$ or less, more preferably 280 $m^2/g$ or less, still more preferably 200 $m^2/g$ or less. The silica with a $N_2SA$ of more than 300 $m^2/g$ tends to disperse poorly, resulting in an increase in heat build-up. The $N_2SA$ of silica is determined by the BET method in conformity with ASTM D3037-81.

When silica is used, the amount of silica per 100 parts by mass of the rubber component is preferably 5 parts by mass or more, more preferably 20 parts by mass or more, still more preferably 30 parts by mass or more. If the amount is less than 5 parts by mass, the rubber is insufficiently reinforced, resulting in a durability problem. The amount of silica is also preferably 100 parts by mass or less, more preferably 80 parts by mass or less, still more preferably 60 parts by mass or less. If the amount is more than 100 parts by mass, processability tends to be deteriorated.

In the case of the rubber composition containing silica, preferably it contains a silane coupling agent for better dispersion of silica. Examples of the silane coupling agent include those mentioned for the rubber composition for bead apexes. These coupling agents may be used either each alone or in combinations of two or more thereof.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is preferably 20 parts by mass or less, more preferably 15 parts by mass or less, still more preferably 10 parts by mass or less. If the amount of silane coupling agent used exceeds 20 parts by mass, the effect of enhancing dispersion of silica tends not to increase, while the cost tends to unnecessarily increase. In addition, scorch time tends to be reduced, thereby reducing processability during kneading and extrusion.

In addition to the above materials, the rubber composition for innerliners in the present invention may appropriately contain various materials commonly used in the tire industry, including plasticizers such as oil or wax, stearic acid, various kinds of antioxidants, vulcanizing agents such as sulfur, and vulcanization accelerators.

The rubber composition for innerliners in the present invention is used in innerliners which are to be configured to form an inner cavity surface of a tire. This component reduces permeation of air to maintain the internal pressure of a tire. Specifically, the rubber composition can be used in components shown in FIG. 1 of JP 2008-291091 A, FIGS. 1 and 2 of JP 2007-160980 A, and the like.

<Undertread>

In the rubber composition for undertreads in the present invention, the amount of the modified natural rubber based on 100% by mass of the rubber component of the rubber composition is preferably 30% by mass or more, more preferably 50% by mass or more, still more preferably 70% by mass or more. If the amount is less than 30% by mass, excellent fuel economy may not be obtained. Moreover, the upper limit of the amount is not particularly restricted and may be 100% by mass.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). These may be used alone or in combinations of two or more. Among these, NR, ENR, SBR, and BR are preferred as they do not deteriorate the properties of the rubber composition in the present invention.

From the standpoint of allowing minimum required levels of fuel economy, heat aging resistance, and processability to be achieved, the amount of other rubber materials based on 100% by mass of the rubber component is preferably 30% by mass or less, more preferably 10% by mass or less.

The rubber composition for undertreads in the present invention contains carbon black and/or a white filler. This produces an excellent reinforcing effect.

The carbon black is not particularly limited, and may be GPF, FEF, HAF, ISAF, SAF, or the like. These carbon blacks may be used alone or in combinations of two or more.

The carbon black preferably has a nitrogen adsorption specific surface area ($N_2SA$) of 30 $m^2/g$ or more, more preferably 60 $m^2/g$ or more. The $N_2SA$ of carbon black is also preferably 200 $m^2/g$ or less, more preferably 150 $m^2/g$ or less, still more preferably 100 $m^2/g$ or less. If the $N_2SA$ is less than 30 $m^2/g$, a sufficient reinforcing effect may not be obtained. If the $N_2SA$ is more than 200 $m^2/g$, fuel economy tends to be reduced.

The nitrogen adsorption specific surface area of carbon black is determined according to the method A in JIS K 6217.

When carbon black is used, the amount of carbon black per 100 parts by mass of the rubber component is preferably 10 parts by mass or more, more preferably 30 parts by mass or more. The amount of carbon black is preferably 150 parts by mass or less, more preferably 100 parts by mass or less, still more preferably 80 parts by mass or less. If the amount is less than 10 parts by mass, a sufficient reinforcing effect may not be obtained. If the amount is more than 150 parts by mass, dispersibility and processability tend to be deteriorated.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Among these, silica is particularly preferred in view of fuel economy.

When a white filler is used, the amount of white filler per 100 parts by mass of the rubber component is preferably 5 parts by mass or more, more preferably 20 parts by mass or more, still more preferably 30 parts by mass or more. If the amount is less than 5 parts by mass, the rubber is insufficiently reinforced, resulting in a durability problem. The amount of white filler is also preferably 100 parts by mass or less, more preferably 80 parts by mass or less, still more preferably 60 parts by mass or less. If the amount is more than 100 parts by mass, processability tends to be deteriorated.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 $m^2/g$ or more, still more preferably 80 $m^2/g$ or more. If the $N_2SA$ is less than 40 $m^2/g$, tensile strength after vulcanization tends to be reduced. The nitrogen adsorption specific surface area ($N_2SA$) is also preferably 300 $m^2/g$ or less, more preferably 200 $m^2/g$ or less, still more preferably 130 $m^2/g$ or less. If the $N_2SA$ is more than 300 $m^2/g$, low heat build-up properties and rubber processability tend to be reduced. The $N_2SA$ of silica is determined by the BET method in conformity with ASTM D3037-81.

When silica is used, the amount of silica per 100 parts by mass of the rubber component is preferably 5 parts by mass or more, more preferably 20 parts by mass or more, still more preferably 30 parts by mass or more. If the amount is less than 5 parts by mass, the rubber is insufficiently reinforced, resulting in a durability problem. The amount of silica is also preferably 100 parts by mass or less, more preferably 80 parts by mass or less, still more preferably 60 parts by mass or less. If the amount is more than 100 parts by mass, processability tends to be deteriorated.

In the case of the rubber composition containing silica, preferably it contains a silane coupling agent for better dispersion of silica. Examples of the silane coupling agent include those mentioned for the rubber composition for bead apexes. These coupling agents may be used either each alone or in combinations of two or more thereof.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is preferably 20 parts by mass or less, more preferably 15 parts by mass or less, still more preferably 10 parts by mass or less. If the amount of silane coupling agent used exceeds 20 parts by mass, the effect of enhancing dispersion of silica tends not to increase, while the cost tends to unnecessarily increase. In addition, scorch time tends to be reduced, thereby reducing processability during kneading and extrusion.

In the rubber composition for undertreads in the present invention, the combined amount of carbon black and white filler per 100 parts by mass of the rubber component is preferably 5 parts by mass or more, more preferably 10 parts by mass or more, still more preferably 20 parts by mass or more. The combined amount is preferably 150 parts by mass or less, more preferably 100 parts by mass or less. When the combined amount falls within the range described above, good fuel economy can be obtained.

The rubber composition preferably contains oil or a plasticizer. This makes it possible to adjust the hardness to an appropriately low level, providing good processability. Examples of the oil include paraffinic process oils, aromatic process oils, naphthenic process oils, vegetable fats and oils, and mixtures of the foregoing. The plasticizer is not particularly limited, and may be any of known plasticizers.

In addition to the above materials, the rubber composition for undertreads in the present invention may appropriately contain various materials commonly used in the tire industry, including stearic acid, wax, resins, various kinds of antioxidants, vulcanizing agents such as sulfur, and vulcanization accelerators.

The rubber composition for undertreads in the present invention is used in undertreads of tires. The term "undertread" refers to a component located between the tread rubber and the breaker (belt) rubber and covering the breaker rubber on the tire surface side. Specifically, the undertread is a component shown in, for example, FIG. 1 of JP 2009-191132 A.

<Breaker Topping>

In the rubber composition for breaker toppings in the present invention, the amount of the modified natural rubber based on 100% by mass of the rubber component of the rubber composition is 5% by mass or more, preferably 10% by mass or more, more preferably 20% by mass or more, still more preferably 50% by mass or more, particularly preferably 80% by mass or more. Moreover, the upper limit is not particularly restricted and may be 100% by mass. If the amount is less than 5% by mass, excellent fuel economy or rubber strength may not be obtained.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). Preferred among these is NR as it provides good tensile properties at break (good tensile strength). Examples of NR include those commonly used in the tire industry, such as SIR20, RSS#3, or TSR20. Among these, RSS#3 is particularly preferred in view of rubber strength.

The rubber composition for breaker toppings in the present invention contains carbon black. This produces an excellent reinforcing effect.

The carbon black is not particularly limited, and may be GPF, FEF, HAF, ISAF, SAF, or the like. These carbon blacks may be used alone or in combinations of two or more.

The carbon black preferably has a nitrogen adsorption specific surface area ($N_2SA$) of 20 $m^2/g$ or more, more preferably 30 $m^2/g$ or more. The $N_2SA$ of carbon black is also preferably 150 $m^2/g$ or less, more preferably 100 $m^2/g$ or less, still more preferably 70 $m^2/g$ or less, particularly preferably 50 $m^2/g$ or less. If the $N_2SA$ is less than 30 $m^2/g$, a sufficient reinforcing effect tends not to be obtained. If the $N_2SA$ is more than 150 $m^2/g$, the unvulcanized rubber composition tends to have a very high viscosity and thus deteriorated processability. In addition, fuel economy tends to be deteriorated.

The nitrogen adsorption specific surface area of carbon black is determined according to the method A in JIS K 6217.

The amount of carbon black per 100 parts by mass of the rubber component is preferably 10 parts by mass or more, more preferably 15 parts by mass or more. The amount of carbon black is preferably 100 parts by mass or less, more preferably 80 parts by mass or less, still more preferably 70 parts by mass or less. If the amount is less than 10 parts by mass, sufficient reinforcing properties tend not to be obtained. If the amount is more than 100 parts by mass, heat build-up tends to increase, resulting in deteriorated fuel economy.

The rubber composition for breaker toppings in the present invention may contain fillers other than carbon black. Examples of the filler include those commonly used in the rubber industry, for example, silica, calcium carbonate, mica such as sericite, aluminum hydroxide, magnesium oxide, magnesium hydroxide, clay, talc, alumina, and titanium oxide. Among these, silica is preferred in view of fuel economy.

The silica is not particularly limited. Examples of the silica include dry silica (anhydrous silicic acid) and wet silica (hydrous silicic acid). Preferred is wet silica as it has many silanol groups.

The rubber composition for breaker toppings in the present invention preferably contains an organic acid cobalt salt. The organic acid cobalt salt serves to crosslink the rubber with cords (steel cords). Thus, the use of this component enhances adhesion between the cord and the rubber.

Examples of the organic acid cobalt salt include cobalt stearate, cobalt naphthenate, cobalt neodecanoate, and cobalt boron 3 neodecanoate. Among these, cobalt stearate or cobalt naphthenate is preferred.

The amount of organic acid cobalt salt, calculated as cobalt metal, per 100 parts by mass of the rubber component is preferably 0.05 parts by mass or more, more preferably 0.08 parts by mass or more. If the amount is less than 0.05 parts by mass, the adhesion between the plated layer of the steel cords and the rubber may be insufficient. The amount of organic acid cobalt salt is also preferably 0.5 parts by mass or less, more preferably 0.3 parts by mass or less, still more preferably 0.2 parts by mass or less. If the amount is more than 0.5 parts by mass, the rubber tends to be markedly oxidatively degraded and show deteriorated tensile properties at break.

The rubber composition for breaker toppings in the present invention preferably contains zinc oxide. The use of zinc oxide enhances adhesion between the plated layer of the steel cords and the rubber. Further, zinc oxide functions as a vulcanization activator for rubber and is also effective in preventing scorching.

The amount of zinc oxide per 100 parts by mass of the rubber component is preferably 2 parts by mass or more, more preferably 5 parts by mass or more, still more preferably 6 parts by mass or more. If the amount is less than 2 parts by mass, the adhesion between the plated layer of the steel cords and the rubber may be insufficient, and the rubber may be insufficiently vulcanized. The amount of zinc oxide is also preferably 25 parts by mass or less, more preferably 20 parts by mass or less, still more preferably 15 parts by mass or less. If the amount is more than 25 parts by mass, rubber strength may be reduced.

In the rubber composition for breaker toppings in the present invention, sulfur can be suitably used as a vulcanizing agent. Examples of the sulfur include powdered sulfur, precipitated sulfur, colloidal sulfur, insoluble sulfur, and highly dispersible sulfur.

The amount of sulfur per 100 parts by mass of the rubber component is preferably 2 parts by mass or more, more preferably 3 parts by mass or more, still more preferably 4 parts by mass or more. If the amount is less than 2 parts by mass, a sufficient crosslink density may not be obtained, resulting in deteriorated adhesive properties. The amount of sulfur is also preferably 10 parts by mass or less, more preferably 8 parts by mass or less, still more preferably 6 parts by mass or less. If the amount is more than 10 parts by mass, heat aging resistance may be deteriorated.

In addition to the above materials, the rubber composition for breaker toppings in the present invention may appropriately contain various materials commonly used in the tire industry, including plasticizers such as oil, stearic acid, various kinds of antioxidants, and vulcanization accelerators.

Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Among these, sulfenamide vulcanization accelerators are preferred as they provide excellent results in terms of scorch resistance.

Examples of sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

Examples of the antioxidant include amine-ketone antioxidants, amine antioxidants, phenol antioxidants, imidazole antioxidants, and thiourea antioxidants. These antioxidants may be used alone or in combinations of two or more. Among these, amine antioxidants are preferred as they provide excellent tensile properties at break and excellent heat resistance.

Examples of amine antioxidants include amine derivatives such as diphenylamine derivatives and p-phenylenediamine derivatives. Examples of diphenylamine derivatives include p-(p-toluenesulfonylamide)-diphenylamine and octylated diphenylamine. Examples of p-phenylenediamine derivatives include N-(1,3-dimethylbutyl)-N'-phenyl-p-phenylenediamine (6PPD), N-phenyl-N'-isopropyl-p-phenylenediamine (IPPD), and N,N'-di-2-naphthyl-p-phenylenediamine.

The amount of antioxidant per 100 parts by mass of the rubber component is preferably 1 part by mass or more, more preferably 1.3 parts by mass or more. If the amount is less than 1 part by mass, tensile properties at break may not be enhanced. The amount of antioxidant is also preferably 6 parts by mass or less, more preferably 4 parts by mass or less, still more preferably 2 parts by mass or less. If the amount is more than 6 parts by mass, the antioxidant may bloom to the surface, resulting in reduced rubber properties. Since the rubber composition in the present invention is excellent in heat aging resistance, it can show sufficient durability even when the amount of antioxidant is 2 parts by mass or less.

Examples of the oil include process oils, vegetable fats and oils, and mixtures of the foregoing. Examples of process oils include paraffinic process oils, naphthenic process oils, and aromatic process oils.

The amount of oil per 100 parts by mass of the rubber component is preferably 0.5 parts by mass or more, more preferably 1 part by mass or more. The amount of oil is also preferably 10 parts by mass or less, more preferably 8 parts by mass or less, still more preferably 6 parts by mass or less. If the amount is outside the range described above, hygrothermal peeling resistance and durability may not be sufficiently enhanced.

The rubber composition for breaker toppings in the present invention is used as a rubber composition for steel cord toppings. Examples of the steel cord include single-twisted steel cords of the 1×n structure and layer-twisted steel cords of the k+m structure (wherein n represents an integer of 1 to 27, k represents an integer of 1 to 10, and m represents an integer of 1 to 3).

The rubber composition for breaker toppings in the present invention is used for breakers which are to be positioned inside the tread and radially outside of the carcass. Specifically, the rubber composition can be used for breakers shown in FIG. 3 of JP 2003-94918 A, FIG. 1 of JP 2004-67027 A, FIGS. 1 to 4 of JP H04-356205 A, and the like.

The pneumatic tire including a breaker topping of the present invention can be formed from the above-described rubber composition by conventional methods. Specifically, steel cords are coated with the rubber composition and formed into a breaker shape, followed by being assembled with other tire components to build an unvulcanized tire, which is then vulcanized, whereby a pneumatic tire (e.g. radial tire) can be formed.

<Ply Topping>

In the rubber composition for ply toppings in the present invention, the amount of the modified natural rubber based on 100% by mass of the rubber component of the rubber composition is 5% by mass or more, preferably 10% by mass or more, more preferably 20% by mass or more, still more preferably 50% by mass or more. If the amount is less than 5% by mass, excellent fuel economy or rubber strength may not be obtained. Moreover, the upper limit of the amount is not particularly restricted, but is preferably 90% by mass or less, more preferably 80% by mass or less.

The rubber composition for ply toppings in the present invention preferably contains styrene-butadiene rubber (SBR) in the rubber component.

The styrene-butadiene rubber (SBR) to be used in the present invention is not particularly limited. Examples include solution-polymerized SBR (S-SBR), emulsion-polymerized SBR (E-SBR), and modified SBRs prepared therefrom. Examples of the modified SBR include SBR whose chain end and/or backbone is modified, and modified SBRs (e.g. condensates, those having a branched structure) which are obtained by coupling with tin or silicon compounds or the like.

The SBR preferably has a styrene content of 5% by mass or more, more preferably 10% by mass or more, still more preferably 20% by mass or more. If the styrene content is less than 5% by mass, sufficient grip performance or rubber strength may not be obtained. The styrene content is also preferably 60% by mass or less, more preferably 50% by mass or less, still more preferably 30% by mass or less. If the styrene content is more than 60% by mass, excellent fuel economy may not be obtained. Herein, the styrene content of SBR is determined by $H^1$-NMR.

The SBR preferably has a vinyl content of 10% by mass or more, more preferably 15% by mass or more. If the vinyl content is less than 10% by mass, sufficient grip performance or rubber strength may not be obtained. The vinyl content is also preferably 65% by mass or less, more preferably 60% by mass or less, still more preferably 30% by mass or less. If the vinyl content is more than 65% by mass, excellent fuel economy may not be obtained. Herein, the vinyl content of SBR refers to the vinyl content in the butadiene portion and is determined by $H^1$-NMR.

The amount of SBR based on 100% by mass of the rubber component is preferably 5% by mass or more, more preferably 10% by mass or more. If the amount is less than 5% by mass, reversion resistance may be reduced. The amount of SBR is preferably 60% by mass or less, more preferably 50% by mass or less. If the amount is more than 60% by mass, the modified natural rubber may fail to provide excellent fuel economy.

Examples of usable rubber materials other than the modified natural rubber and SBR include natural rubber (non-modified) (NR), epoxidized natural rubber (ENR), polyisoprene rubber (IR), polybutadiene rubber (BR), styrene-isoprene-butadiene rubber (SIBR), ethylene-propylene-diene rubber (EPDM), chloroprene rubber (CR), and acrylonitrile-butadiene rubber (NBR).

The rubber composition for ply toppings in the present invention contains carbon black. This produces an excellent reinforcing effect.

The carbon black is not particularly limited, and may be GPF, FEF, HAF, ISAF, SAF, or the like. These carbon blacks may be used alone or in combinations of two or more.

The carbon black preferably has a nitrogen adsorption specific surface area ($N_2SA$) of 20 $m^2/g$ or more, more preferably 30 $m^2/g$ or more. The $N_2SA$ of carbon black is also preferably 150 $m^2/g$ or less, more preferably 100 $m^2/g$ or less, still more preferably 70 $m^2/g$ or less, particularly preferably 50 $m^2/g$ or less. If the $N_2SA$ is less than 20 $m^2/g$, a sufficient reinforcing effect tends not to be obtained. If the $N_2SA$ is more than 150 $m^2/g$, the unvulcanized rubber composition tends to have a very high viscosity and thus deteriorated processability. In addition, fuel economy tends to be deteriorated.

The nitrogen adsorption specific surface area of carbon black is determined according to the method A in JIS K 6217.

The amount of carbon black per 100 parts by mass of the rubber component is preferably 10 parts by mass or more, more preferably 15 parts by mass or more. The amount of carbon black is preferably 100 parts by mass or less, more preferably 80 parts by mass or less, still more preferably 70 parts by mass or less. If the amount is less than 10 parts by mass, sufficient reinforcing properties tend not to be obtained. If the amount is more than 100 parts by mass, heat build-up tends to increase, resulting in deteriorated fuel economy.

The rubber composition for ply toppings in the present invention may contain fillers other than carbon black. Examples of the filler include those commonly used in the rubber industry, for example, silica, calcium carbonate, mica such as sericite, aluminum hydroxide, magnesium oxide, magnesium hydroxide, clay, talc, alumina, and titanium oxide. Among these, silica is preferred in view of fuel economy.

The silica is not particularly limited. Examples of the silica include dry silica (anhydrous silicic acid) and wet silica (hydrous silicic acid). Preferred is wet silica as it has many silanol groups.

The rubber composition for ply toppings in the present invention preferably contains zinc oxide. The use of zinc oxide enhances adhesion between the cord and the rubber. Further, zinc oxide functions as a vulcanization activator for rubber and is also effective in preventing scorching.

The amount of zinc oxide per 100 parts by mass of the rubber component is preferably 2 parts by mass or more, more preferably 3 parts by mass or more, still more preferably 4 parts by mass or more. If the amount is less than 2 parts by mass, the adhesion between the plated layer of the steel cords and the rubber may be insufficient, and the rubber may be insufficiently vulcanized. The amount of zinc oxide is also preferably 25 parts by mass or less, more preferably 20 parts by mass or less, still more preferably 15 parts by mass or less. If the amount is more than 25 parts by mass, rubber strength may be reduced.

In the rubber composition for ply toppings in the present invention, sulfur can be suitably used as a vulcanizing agent. Examples of the sulfur include powdered sulfur, precipitated sulfur, colloidal sulfur, insoluble sulfur, and highly dispersible sulfur.

The amount of sulfur per 100 parts by mass of the rubber component is preferably 2 parts by mass or more, more preferably 3 parts by mass or more. If the amount is less than 2 parts by mass, a sufficient crosslink density may not be obtained, resulting in deteriorated adhesive properties. The amount of sulfur is also preferably 10 parts by mass or less, more preferably 8 parts by mass or less, still more preferably 6 parts by mass or less. If the amount is more than 10 parts by mass, resistance to thermal degradation may be deteriorated.

In addition to the above materials, the rubber composition for ply toppings in the present invention may appropriately contain various materials commonly used in the tire industry, including plasticizers such as oil, stearic acid, various kinds of antioxidants, and vulcanization accelerators.

Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Among these, sulfenamide vulcanization accelerators are preferred as they provide excellent results in terms of scorch resistance.

Examples of sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

Examples of the oil include process oils, vegetable fats and oils, and mixtures of the foregoing. Examples of process oils include paraffinic process oils, naphthenic process oils, and aromatic process oils.

The amount of oil per 100 parts by mass of the rubber component is preferably 0.5 parts by mass or more, more preferably 1 part by mass or more. Also, the amount of oil is preferably 10 parts by mass or less, more preferably 8 parts by mass or less, still more preferably 6 parts by mass or less. If the amount is outside the range described above, hygrothermal peeling resistance and durability may not be sufficiently enhanced.

The rubber composition for ply toppings in the present invention can be suitably used in ply toppings for coating cords in carcass plies or belt plies.

The pneumatic tire including a ply topping of the present invention can be formed from the above-described rubber composition by conventional methods. Specifically, the rubber composition is kneaded by a conventional procedure; the resulting unvulcanized rubber composition is press-bonded to cords to form an unvulcanized ply strip (rubberized cords); and the ply strip is assembled with other tire components in a conventional manner on a tire building machine to build an unvulcanized tire. The unvulcanized tire is heat pressed in a vulcanizer, whereby a pneumatic tire of the present invention can be obtained.

<Tread>

In the rubber composition for treads in the present invention, the amount of the modified natural rubber based on 100% by mass of the rubber component of the rubber composition is 5% by mass or more, preferably 10% by mass or more, more preferably 20% by mass or more. If the amount is less than 5% by mass, excellent fuel economy may not be obtained. The amount of the modified natural rubber is also preferably 80% by mass or less, more preferably 60% by mass or less, still more preferably 40% by mass or less. If the amount is more than 80% by mass, wet-grip performance may be reduced.

The styrene-butadiene rubber (SBR) to be used in the present invention is not particularly limited. Examples include solution-polymerized SBR (S-SBR), emulsion-polymerized SBR (E-SBR), and modified SBRs prepared therefrom. Examples of the modified SBR include SBR whose chain end and/or backbone is modified, and modified SBRs (e.g. condensates, those having a branched structure) which are obtained by coupling with tin or silicon compounds or the like.

The SBR preferably has a styrene content of 5% by mass or more, more preferably 10% by mass or more, still more preferably 20% by mass or more. If the styrene content is less than 5% by mass, sufficient grip performance or rubber strength may not be obtained. The styrene content is also preferably 60% by mass or less, more preferably 50% by mass or less, still more preferably 30% by mass or less. If the styrene content is more than 60% by mass, excellent fuel economy may not be obtained. Herein, the styrene content of SBR is determined by $H^1$-NMR.

The SBR preferably has a vinyl content of 10% by mass or more, more preferably 15% by mass or more, still more preferably 20% by mass or more. If the vinyl content is less than 10% by mass, sufficient grip performance or rubber strength may not be obtained. The vinyl content is also preferably 65% by mass or less, more preferably 60% by mass or less, still more preferably 30% by mass or less. If the vinyl content is more than 65% by mass, excellent fuel economy may not be obtained. Herein, the vinyl content of SBR refers to the vinyl content in the butadiene portion and is determined by $H^1$-NMR.

The amount of SBR based on 100% by mass of the rubber component is preferably 40% by mass or more, more preferably 50% by mass or more. If the amount is less than 40% by mass, sufficient grip performance may not be obtained. The amount of SBR is preferably 90% by mass or less, more preferably 80% by mass or less. If the amount is more than 90% by mass, the modified natural rubber may fail to provide excellent fuel economy.

Examples of usable rubber materials other than the modified natural rubber and SBR include natural rubber (non-modified) (NR), epoxidized natural rubber (ENR), polyisoprene rubber (IR), polybutadiene rubber (BR), styrene-isoprene-butadiene rubber (SIBR), ethylene-propylene-diene rubber (EPDM), chloroprene rubber (CR), and acrylonitrile-butadiene rubber (NBR).

The rubber composition for treads in the present invention contains a white filler. This produces a reinforcing effect.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Silica is preferred in view of fuel economy.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 $m^2/g$ or more, still more preferably 100 $m^2/g$ or more, particularly preferably 150 $m^2/g$ or more. If the $N_2SA$ is less than 40 $m^2/g$, tensile strength after vulcanization tends to be reduced. The $N_2SA$ of silica is also preferably 500 $m^2/g$ or less, more preferably 300 $m^2/g$ or less, still more preferably 200 $m^2/g$ or less. If the $N_2SA$ is more than 500 $m^2/g$, low heat build-up properties and rubber processability tend to be reduced. The nitrogen adsorption specific surface area of silica is determined by the BET method in conformity with ASTM D3037-81.

The amount of white filler or silica per 100 parts by mass of the rubber component is preferably 5 parts by mass or more, more preferably 20 parts by mass or more, still more preferably 30 parts by mass or more, particularly preferably 40 parts by mass or more. If the amount is less than 5 parts by mass, low heat build-up properties may be insufficient. Also, the amount of white filler or silica is preferably 200 parts by mass or less, more preferably 150 parts by mass or less, still more preferably 130 parts by mass or less. If the amount is more than 200 parts by mass, the filler tends to disperse poorly in the rubber, resulting in deteriorated rubber processability.

The rubber composition for treads in the present invention preferably contains a silane coupling agent. Examples of the silane coupling agent include those mentioned for the rubber composition for bead apexes. These coupling agents may be used either each alone or in combinations of two or more thereof.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is also preferably 20 parts by mass or less, more preferably 15 parts by mass or less, still more preferably 10 parts by mass or less. If the amount exceeds 20 parts by mass, the effect of enhancing dispersion of silica tends not to increase, while the cost tends to unnecessarily increase. In addition, scorch time tends to be reduced, thereby reducing processability during kneading and extrusion.

In addition to the white filler, carbon black is preferably used as a filler. The use of carbon black produces an excellent reinforcing effect.

The carbon black preferably has a nitrogen adsorption specific surface area ($N_2SA$) of 70 $m^2/g$ or more, more preferably 100 $m^2/g$ or more. The $N_2SA$ of carbon black is also preferably 200 $m^2/g$ or less, more preferably 180 $m^2/g$ or less, still more preferably 150 $m^2/g$ or less. If the $N_2SA$ is less than 70 $m^2/g$, a sufficient reinforcing effect tends not to be obtained. If the $N_2SA$ is more than 200 $m^2/g$, fuel economy may be reduced.

The nitrogen adsorption specific surface area of carbon black is determined according to the method A in JIS K 6217.

The amount of carbon black per 100 parts by mass of the rubber component is preferably 1 part by mass or more, more preferably 2 parts by mass or more. The amount of carbon black is preferably 150 parts by mass or less, more preferably 100 parts by mass or less, still more preferably 50 parts by mass or less, particularly preferably 30 parts by mass or less. When the amount falls within the range described above, good fuel economy, abrasion resistance, and wet-grip performance can be obtained.

In the rubber composition for treads in the present invention, the combined amount of white filler and carbon black per 100 parts by mass of the rubber component is preferably 5 parts by mass or more, more preferably 10 parts by mass or more, still more preferably 20 parts by mass or more. The combined amount is preferably 150 parts by mass or less, more preferably 120 parts by mass or less. When the combined amount falls within the range described above, good fuel economy, abrasion resistance, and wet-grip performance can be obtained.

The rubber composition preferably contains oil as a plasticizer. This makes it possible to adjust the hardness to an appropriately low level, providing good processability. Non-limiting examples of the oil include conventional oils such as process oils, e.g., paraffinic process oils, aromatic process oils, and naphthenic process oils, vegetable fats and oils, and mixtures of the foregoing.

The amount of oil per 100 parts by mass of the rubber component is preferably 1 part by mass or more, more preferably 2 parts by mass or more. The amount of oil is also preferably 30 parts by mass or less, more preferably 20 parts by mass or less. When the amount falls within the range described above, excellent fuel economy and excellent wet-grip performance can be obtained while good processability is provided.

In addition to the above materials, the rubber composition for treads in the present invention may appropriately contain various materials commonly used in the tire industry, such as zinc oxide, stearic acid, various kinds of antioxidants, plasticizers excluding oil (e.g., wax), vulcanizing agents (e.g. sulfur, organic peroxides), and vulcanization accelerators (e.g. sulfenamide vulcanization accelerators, guanidine vulcanization accelerators).

The rubber composition for treads in the present invention can be used in treads of tires.

The rubber compositions for the above components in the present invention can be prepared by known methods, such as, for example, by kneading the above-described ingredients using a rubber kneading machine such as an open roll mill or a Banbury mixer, and then vulcanizing the kneaded mixture.

The pneumatic tires including the above-described components excluding the breaker topping and the ply topping in the present invention can be formed from the above-described rubber compositions by conventional methods. Specifically, the unvulcanized rubber compositions optionally containing various additives are extruded into the shape of a target component, and formed together with other tire components in a conventional manner on a tire building machine to build an unvulcanized tire, which is then heat pressed in a vulcanizer, whereby a tire can be formed.

The pneumatic tires including the above components of the present invention can be suitably used for passenger vehicles, trucks and buses, two-wheeled vehicles, racing vehicles, and the like, and especially for passenger vehicles.

The rubber composition contained in the studless winter tire of the fourth aspect will also be described below.

In the rubber composition for studless winter tires in the present invention, the amount of the modified natural rubber based on 100% by mass of the rubber component of the rubber composition is 5% by mass or more, preferably 30% by mass or more, more preferably 40% by mass or more, still more preferably 50% by mass or more. If the amount is less than 5% by mass, excellent fuel economy may not be obtained. The amount of the modified natural rubber is also preferably 90% by mass or less, more preferably 80% by mass or less, still more preferably 75% by mass or less. If the amount is more than 90% by mass, performance on snow and ice and abrasion resistance may be reduced.

Examples of usable rubber materials other than the modified natural rubber include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR).

In particular, BR is preferably added to achieve excellent low-temperature properties. In the case of rubber compounds containing BR together with a white filler such as silica, usually the filler is poorly dispersed, and thus it is difficult to obtain desired properties. In the present invention, in contrast, the use of the modified natural rubber enhances the interaction between the filler and the rubber component. Accordingly, the filler is better dispersed and fuel economy, performance on snow and ice, and abrasion resistance are improved. In addition, good processability is obtained. As a result, the balance of these properties is synergistically improved.

The BR is not particularly limited, and examples include those commonly used in the tire industry. In order to sufficiently ensure low-temperature properties, the BR preferably has a cis content of 70% by mass or more, more preferably 90% by mass or more, still more preferably 97% by mass or more.

The BR preferably has a Mooney viscosity ($ML_{1+4}$ (100° C.)) of 10 or more, more preferably 30 or more. If the Mooney viscosity is less than 10, filler dispersibility tends to be reduced. The Mooney viscosity is preferably 120 or less, more preferably 80 or less. If the Mooney viscosity is more than 120, compound scorch (discoloration) may be caused during extrusion processing.

The BR preferably has a molecular weight distribution (Mw/Mn) of 1.5 or more, more preferably 2.0 or more. If the Mw/Mn is less than 1.5, processability may be deteriorated. The BR preferably has a Mw/Mn of 5.0 or less, more preferably 4.0 or less. If the Mw/Mn is more than 5.0, abrasion resistance tends to be deteriorated. In the present invention, the Mn and Mw values are measured by GPC and calibrated with polystyrene standards.

From the standpoint of achieving required performance on snow and ice, the amount of BR based on 100% by mass of the rubber component is preferably 10% by mass or more, more preferably 20% by mass or more, still more preferably 30% by mass or more. In view of processability, the amount of BR is preferably 80% by mass or less, more preferably 70% by mass or less, still more preferably 60% by mass or less.

The rubber composition for studless winter tires in the present invention contains carbon black and/or a white filler. This produces a reinforcing effect.

The carbon black preferably has a nitrogen adsorption specific surface area ($N_2SA$) of 50 $m^2/g$ or more, more preferably 70 $m^2/g$ or more. The $N_2SA$ of carbon black is also preferably 200 $m^2/g$ or less, more preferably 180 $m^2/g$ or less, still more preferably 150 $m^2/g$ or less. The carbon black with a $N_2SA$ of less than 50 $m^2/g$ tends not to produce a sufficient reinforcing effect. The carbon black with a $N_2SA$ of more than 200 $m^2/g$ tends to lead to reduced fuel economy.

The nitrogen adsorption specific surface area of carbon black is determined according to the method A in JIS K 6217.

The amount of carbon black per 100 parts by mass of the rubber component is preferably 1 part by mass or more, more preferably 2 parts by mass or more. The amount of carbon black is preferably 150 parts by mass or less, more preferably 100 parts by mass or less, still more preferably 50 parts by mass or less, particularly preferably 30 parts by mass or less. When the amount falls within the range described above, good fuel economy, performance on ice snow and ice, and abrasion resistance can be obtained.

Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Silica is preferred in view of fuel economy.

The silica is not particularly limited. Examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 $m^2/g$ or more, still more preferably 100 $m^2/g$ or more, particularly preferably 150 $m^2/g$ or more. If the $N_2SA$ is less than 40 $m^2/g$, tensile strength after vulcanization tends to be reduced. The $N_2SA$ of silica is also preferably 500 $m^2/g$ or less, more preferably 300 $m^2/g$ or less, still more preferably 250 $m^2/g$ or less. If the $N_2SA$ is more than 500 $m^2/g$, low heat build-up properties and rubber processability tend to be reduced. The nitrogen adsorption specific surface area of silica is determined by the BET method in conformity with ASTM D3037-81.

The amount of silica per 100 parts by mass of the rubber component is preferably 5 parts by mass or more, more preferably 20 parts by mass or more, still more preferably 30 parts by mass or more, particularly preferably 40 parts by mass or more. If the amount is less than 5 parts by mass, low heat build-up properties may be insufficient. Also, the amount of silica is preferably 200 parts by mass or less, more preferably 150 parts by mass or less, still more preferably 130 parts by mass or less. If the amount is more than 200 parts by mass, the filler tends to disperse poorly in the rubber, resulting in deteriorated rubber processability.

The rubber composition for studless winter tires in the present invention preferably contains a coupling agent. Examples of the silane coupling agent include those mentioned for the rubber composition for bead apexes. These coupling agents may be used either each alone or in combinations of two or more thereof.

The amount of silane coupling agent per 100 parts by mass of silica is preferably 0.5 parts by mass or more, more preferably 1.5 parts by mass or more, still more preferably 2.5 parts by mass or more. If the amount is less than 0.5 parts by mass, silica may be less likely to be dispersed well. The amount of silane coupling agent is also preferably 20 parts by mass or less, more preferably 15 parts by mass or less, still more preferably 10 parts by mass or less. If the amount exceeds 20 parts by mass, the effect of enhancing dispersion of silica tends not to increase, while the cost tends to unnecessarily increase. In addition, scorch time tends to be reduced, thereby reducing processability during kneading and extrusion.

In the rubber composition for studless winter tires in the present invention, the combined amount of carbon black and white filler per 100 parts by mass of the rubber component is preferably 5 parts by mass or more, more preferably 10 parts by mass or more, still more preferably 20 parts by mass or more. The combined amount is preferably 150 parts by mass or less, more preferably 120 parts by mass or less. When the combined amount falls within the range described above, good fuel economy, performance on snow and ice, and abrasion resistance can be obtained.

The rubber composition preferably contains oil as a plasticizer. This makes it possible to adjust the hardness to an appropriately low level, providing good performance on snow and ice. Non-limiting examples of the oil include conventional oils such as process oils, e.g., paraffinic process oils, aromatic process oils, and naphthenic process oils, vegetable fats and oils, and mixtures of the foregoing.

The amount of oil per 100 parts by mass of the rubber component is preferably 5 parts by mass or more, more preferably 10 parts by mass or more, still more preferably 15 parts by mass or more. If the amount is less than 5 parts by mass, the effect of enhancing performance on snow and ice is less likely to be sufficiently produced. The amount of oil is also preferably 100 parts by mass or less, more preferably 80 parts by mass or less, still more preferably 50 parts by mass or less. If the amount is more than 100 parts by mass, abrasion resistance may be reduced and reversion resistance may also be reduced.

In addition to the above materials, the rubber composition for studless winter tires in the present invention may appropriately contain various materials commonly used in the tire industry, such as zinc oxide, stearic acid, various kinds of antioxidants, plasticizers excluding oil (e.g., wax), vulcanizing agents (e.g. sulfur, organic peroxides), and vulcanization accelerators (e.g. sulfenamide vulcanization accelerators, guanidine vulcanization accelerators).

The rubber compositions for studless winter tires in the present invention can be prepared by known methods, such as, for example, by kneading the above-described ingredients using a rubber kneading machine such as an open roll mill or a Banbury mixer, and then vulcanizing the kneaded mixture.

The rubber composition for studless winter tires in the present invention can be used in components of studless winter tires, such as cap treads, base treads, undertreads, clinch apexes, bead apexes, sidewalls, breakers, edge bands, full bands, breaker cushion rubbers, or rubbers for coating carcass cords, and, in particular, can be suitably used in treads.

The studless winter tire of the present invention can be formed from the above-described rubber composition by conventional methods. Specifically, the unvulcanized rubber composition optionally containing various additives is extruded into the shape of a target tire component (e.g. a tread), and formed together with other tire components in a conventional manner on a tire building machine to build an unvulcanized tire. The unvulcanized tire is heat pressed in a vulcanizer, whereby a studless winter tire of the present invention can be formed.

The studless winter tire of the present invention can be suitably used for passenger vehicles, and trucks and buses (heavy load vehicles).

EXAMPLES

The present invention will be specifically described with reference to, but not limited to, the examples below.

The solid rubbers prepared in the production examples described below were evaluated as follows. The results are shown in Tables 1, 3, 5, 8, 11, 14, 16, 18, 20, and 22.

<Measurement of pH of Rubber>

The prepared rubber in an amount of 5 g was cut into pieces with a size of 5 mm or smaller (about 1-2 mm×about 1-2 mm×about 1-2 mm), which were then placed in a 100-mL beaker and combined with 50 mL of distilled water at room temperature, and the contents were heated to 90° C. over two minutes, followed by irradiation with microwaves (300 W) for 13 minutes (total 15 minutes) while adjusting and maintaining the temperature to 90° C. Then, after the immersion water was cooled to 25° C. in an ice bath, the pH of the immersion water was measured with a pH meter.

<Measurement of Nitrogen Content>

(Acetone Extraction (Preparation of Specimen))

The solid rubbers were finely cut into 1-mm-square pieces. About 0.5 g of sample was weighed and immersed in 50 g of acetone at room temperature (25° C.) for 48 hours. Then, the rubber was taken out and dried. Thus, specimens (after extraction of antioxidants) were prepared.

(Measurement)

The nitrogen content of the specimens was measured by the following method.

The acetone-extracted specimens obtained as above were decomposed and gasified using a trace nitrogen/carbon analyzer "SUMIGRAPH NC 95A (Sumika Chemical Analysis Service, Ltd.)", and the gas generated was analyzed using a gas chromatograph "GC-8A (Shimadzu Corporation)" to determine the nitrogen content.

<Measurement of Phosphorus Content>

The phosphorus content was determined using an ICP emission spectrometer (P-4010, Hitachi, Ltd.).

<Measurement of Gel Content>

The raw rubber was cut into 1 mm×1 mm pieces, and about 70 mg of sample was accurately weighed. Thereto was added 35 mL of toluene, and the mixture was left in a cool, dark place for one week. Subsequently, the mixture was centrifuged so that a gel fraction that was insoluble in toluene was sedimented, and a toluene-soluble supernatant was removed. Only the gel fraction was solidified with methanol and then dried. The mass of the dried gel fraction was measured. The gel content (% by mass) was determined by the following equation:

Gel content (% by mass)=(mass (mg) after drying)/(initial mass (mg) of sample)×100.

<Heat Aging Resistance>

The Mooney viscosity ML (1+4) at 130° C. of the solid rubber was measured before and after being held at 80° C. for 18 hours in conformity with JIS K 6300:2001-1. A heat aging resistance index was then calculated according to the above-described equation.

Examples and comparative examples will be described below for each of the components.

<Sidewall>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt

NR: TSR20

BR: BR150B (cis content: 97% by mass, $ML_{1+4}$ (100° C.): 40) available from Ube Industries, Ltd.

Carbon black: Shoblack N550 ($N_2SA$: 42 $m^2/g$) available from Cabot Japan K. K.

Silica: Ultrasil VN3 ($N_2SA$: 175 $m^2/g$) available from Evonik Degussa

Silane coupling agent: Si266 available from Evonik Degussa

Oil: Diana Process AH-24 available from Idemitsu Kosan Co., Ltd.

Wax: Ozoace 0355 available from Nippon Seiro Co., Ltd.

Zinc oxide: Zinc oxide #2 available from Mitsui Mining and Smelting Co., Ltd.

Stearic acid: stearic acid beads "Tsubaki" available from NOF Corporation

Antioxidant 6C: Nocrac 6C (N-phenyl-N'-(1,3-dimethylbutyl)-p-phenylenediamine, 6PPD) available from Ouchi Shinko Chemical Industrial Co., Ltd.

Antioxidant RD: Antage RD (polymerized 2,2,4-trimethyl-1,2-dihydroquinoline) available from Kawaguchi Chemical Industry Co., LTD.

Sulfur: Seimi Sulfur (oil content: 10%) available from Nippon Kanryu Industry Co., Ltd.

Vulcanization accelerator TBBS: Nocceler NS available from Ouchi Shinko Chemical Industrial Co., Ltd.

Vulcanization accelerator DPG: Soxinol D available from Sumitomo Chemical Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 1A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 3 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 1A) was prepared.

Comparative Production Example 1B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 12 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 1B) was prepared.

Production Example 1C

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 3 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 1C) was prepared.

Comparative Production Example 1D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 1D) was prepared.

Table 1 shows the results of the above-described evaluations performed on the prepared solid rubbers.

Table 1 shows that the modified natural rubbers having a pH ranging from 2 to 7 were excellent in heat aging resistance as compared to the rubbers having a pH outside the range.

<Preparation of Vulcanized Rubber Composition and Test Tire>

According to the formulations shown in Table 2, the chemicals other than the sulfur and the vulcanization accelerators were kneaded using a 1.7-L Banbury mixer. Next, the sulfur and the vulcanization accelerator(s) were kneaded with the kneaded mixture using a roll to prepare an unvulcanized rubber composition. The unvulcanized rubber composition was press-vulcanized for 12 minutes at 150° C. to give a vulcanized product. The kneading process was carried out using 10 times the amount of the rubber obtained in each of the production examples or comparative production examples.

Separately, the unvulcanized rubber composition was formed into the shape of a sidewall and assembled with other tire components on a tire building machine to build an unvulcanized tire, which was then vulcanized at 170° C. for 11 minutes to prepare a test tire (size: 195/65R15).

The thus prepared vulcanized products and test tires were evaluated as follows. Table 2 shows the results.

<Fuel Economy (Rolling Resistance Properties)>

Rolling resistance was measured using a rolling resistance tester by running the test tire mounted on a 15×6 JJ rim at an internal pressure of 230 kPa, a load of 3.43 kN, and a speed of 80 km/h. The results are expressed as an index, with the value of Comparative Example 1-1 set equal to 100. A higher index indicates better fuel economy.

<Flex Crack Growth Resistance Test>

A flex crack growth test was performed on specimens prepared from the vulcanized rubber sheets (vulcanized products) in conformity with JIS K 6260 "Rubber, vulcanized or thermoplastic—Determination of flex cracking and crack growth (De Mattia type)". In the test, the specimens were bent by performing 70% elongation one million times. Then, the length of the formed crack was measured. The results are expressed as an index, with the reciprocal of the value (length) of Comparative Example 1-1 set equal to 100. A higher index indicates more suppression of crack growth and better flex crack growth resistance.

TABLE 1

| | Saponified natural rubber | | Deproteinized natural rubber | | |
|---|---|---|---|---|---|
| | Highly purified natural rubber 1A Production Example 1A | Highly purified natural rubber 1B Comparative Production Example 1B | Highly purified natural rubber 1C Production Example 1C | Highly purified natural rubber 1D Comparative Production Example 1D | Natural rubber TSR20 — |
| pH | 5.6 | 8.4 | 6.3 | 8 | 6.3 |
| Nitrogen content (% by mass) | 0.07 | 0.1 | 0.07 | 0.09 | 0.38 |
| Phosphorus content (ppm) | 79 | 95 | 105 | 113 | 560 |
| Gel content (% by mass) | 6 | 7 | 6 | 12 | 32 |
| Mooney viscosity | 57 | 59 | 59 | 60 | 90 |
| Heat aging resistance (%) | 102 | 60 | 98 | 55 | 107 |

TABLE 2

| | | Sidewall | | | | | | | | |
|---|---|---|---|---|---|---|---|---|---|---|
| | | Saponified natural rubber | | | | | Deproteinized natural rubber | | | Natural rubber |
| | | Example | | | | Comparative Example | Example | | Comparative Example | Comparative Example |
| | | 1-1 | 1-2 | 1-3 | 1-4 | 1-1 | 1-5 | 1-6 | 1-2 | 1-3 |
| Formulation (parts by mass) | Highly purified natural rubber 1A | 40 | 40 | 40 | 40 | — | — | — | — | — |
| | Highly purified natural rubber 1B | — | — | — | — | 40 | — | — | — | — |
| | Highly purified natural rubber 1C | — | — | — | — | — | 40 | 40 | — | — |
| | Highly purified natural rubber 1D | — | — | — | — | — | — | — | 40 | — |
| | NR | — | — | — | — | — | — | — | — | 40 |
| | BR | 60 | 60 | 60 | 60 | 60 | 60 | 60 | 60 | 60 |
| | Carbon black | 50 | 30 | — | 50 | 50 | 50 | 30 | 50 | 50 |
| | Silica | — | — | 55 | — | — | — | — | — | — |
| | Silane coupling agent | — | — | 4.4 | — | — | — | — | — | — |
| | Oil | 5 | 5 | 5 | 5 | 5 | 5 | 5 | 5 | 5 |
| | Wax | 1 | — | — | — | — | — | — | — | — |
| | Antioxidant 6C | 2 | 2 | 2 | 2 | 2 | 2 | 2 | 2 | 2 |
| | Antioxidant RD | 1 | — | — | — | — | — | — | — | — |
| | Stearic acid | 2 | 2 | 2 | 2 | 2 | 2 | 2 | 2 | 2 |
| | Zinc oxide | 4 | 2 | 2 | 2 | 2 | 2 | 2 | 2 | 2 |
| | Sulfur | 3 | 2 | 2 | 2 | 2 | 2 | 2 | 2 | 2 |
| | Vulcanization accelerator TBBS | 1 | 1 | 1 | 1 | 1 | 1 | 1 | 1 | 1 |
| | Vulcanization accelerator DPG | — | — | 0.5 | — | — | — | — | — | — |
| Evaluation | Rolling resistance properties | 115 | 133 | 120 | 111 | 100 | 110 | 125 | 95 | 80 |
| | Flex crack growth resistance | 130 | 155 | 111 | 126 | 100 | 125 | 148 | 95 | 85 |

Table 2 demonstrates that fuel economy, heat aging resistance, and flex crack growth resistance were markedly improved in the examples in which the highly purified natural rubber 1A or 1C was used.

<Base Tread>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt

NR: TSR20

BR: BR150B (cis content: 97% by mass, $ML_{1+4}$ (100° C.): 40) available from Ube Industries, Ltd.

Carbon black: Shoblack N330 ($N_2SA$: 75 $m^2/g$) available from Cabot Japan K. K.

Silica: Ultrasil VN3 ($N_2SA$: 175 $m^2/g$) available from Evonik Degussa

Silane coupling agent: Si266 available from Evonik Degussa

Oil: Diana Process AH-24 available from Idemitsu Kosan Co., Ltd.

Zinc oxide: Zinc oxide #2 available from Mitsui Mining and Smelting Co., Ltd.

Stearic acid: stearic acid beads "Tsubaki" available from NOF Corporation

Antioxidant: Nocrac 6C (N-phenyl-N'-(1,3-dimethylbutyl)-p-phenylenediamine, 6PPD) available from Ouchi Shinko Chemical Industrial Co., Ltd.

Sulfur: Seimi Sulfur (oil content: 10%) available from Nippon Kanryu Industry Co., Ltd.

Vulcanization accelerator TBBS: Nocceler NS available from Ouchi Shinko Chemical Industrial Co., Ltd.

Vulcanization accelerator DPG: Soxinol D available from Sumitomo Chemical Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 2A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 3 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 2A) was prepared.

Comparative Production Example 2B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 12 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 2B) was prepared.

Production Example 2C

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 3 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 2C) was prepared.

Comparative Production Example 2D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 2D) was prepared.

Table 3 shows the results of the above-described evaluations performed on the prepared solid rubbers.

TABLE 3

| | Saponified natural rubber | | Deproteinized natural rubber | | |
|---|---|---|---|---|---|
| | Highly purified natural rubber 2A Production Example 2A | Highly purified natural rubber 2B Comparative Production Example 2B | Highly purified natural rubber 2C Production Example 2C | Highly purified natural rubber 2D Comparative Production Example 2D | Natural rubber TSR20 — |
| pH | 5.7 | 8.3 | 6.1 | 7.9 | 6.2 |
| Nitrogen content (% by mass) | 0.06 | 0.11 | 0.07 | 0.08 | 0.36 |
| Phosphorus content (ppm) | 82 | 97 | 108 | 111 | 590 |
| Gel content (% by mass) | 6.8 | 7.5 | 7 | 11.5 | 29.8 |
| Mooney viscosity | 58 | 60 | 58 | 59 | 88 |
| Heat aging resistance (%) | 101 | 68 | 95 | 60 | 103 |

Table 3 shows that the modified natural rubbers having a pH ranging from 2 to 7 were excellent in heat aging resistance as compared to the rubbers having a pH outside the range.

<Preparation of Test Tire>

According to the formulations shown in Table 4, the chemicals other than the sulfur and the vulcanization accelerators were kneaded using a 1.7-L Banbury mixer. Next, the sulfur and the vulcanization accelerator(s) were kneaded with the kneaded mixture using a roll to prepare an unvulcanized rubber composition. The unvulcanized rubber composition was formed into the shape of a base tread and assembled with other tire components on a tire building machine to build an unvulcanized tire, which was then vulcanized at 170° C. for 11 minutes to prepare a test tire (size: 195/65R15).

The thus prepared test tires were evaluated as follows. Table 4 shows the results.

<Fuel Economy (Rolling Resistance Properties)>

Rolling resistance was measured using a rolling resistance tester by running the test tire mounted on a 15×6 JJ rim at an internal pressure of 230 kPa, a load of 3.43 kN, and a speed of 80 km/h. The results are expressed as an index, with the value of Comparative Example 2-1 set equal to 100. A higher index indicates better fuel economy.

<Handling Stability>

The test tires were mounted on each wheel of a car (a front-engine, front-wheel-drive (FF) car, 2000 cc, made in Japan). A test driver drove the car in a test track and subjectively evaluated the handling stability. The subjective evaluation was based on a scale of 1-10, with 10 being the best. The handling stability was evaluated relative to that of Comparative Example 2-1 set equal to 6. A higher value indicates better handling stability.

TABLE 4

| | | Base tread | | | | | | | |
|---|---|---|---|---|---|---|---|---|---|
| | | Saponified natural rubber | | | | Deproteinized natural rubber | | | Natural rubber |
| | | Example | | | Comparative Example | Example | | Comparative Example | Comparative Example |
| | | 2-1 | 2-2 | 2-3 | 2-1 | 2-4 | 2-5 | 2-2 | 2-3 |
| Formulation (parts by mass) | Highly purified natural rubber 2A | 70 | 70 | 70 | — | — | — | — | — |
| | Highly purified natural rubber 2B | — | — | — | 70 | — | — | — | — |
| | Highly purified natural rubber 2C | — | — | — | — | 70 | 70 | — | — |
| | Highly purified natural rubber 2D | — | — | — | — | — | — | 70 | — |
| | NR | — | — | — | — | — | — | — | 70 |
| | BR | 30 | 30 | 30 | 30 | 30 | 30 | 30 | 30 |
| | Carbon black | 40 | 50 | | 40 | 40 | 50 | 40 | 40 |
| | Silica | — | — | 45 | — | — | — | — | — |
| | Silane coupling agent | — | — | 3.6 | — | — | — | — | — |
| | Oil | 5 | 5 | 5 | 5 | 5 | 5 | 5 | 5 |
| | Antioxidant | 2 | 2 | 2 | 2 | 2 | 2 | 2 | 2 |
| | Stearic acid | 2 | 2 | 2 | 2 | 2 | 2 | 2 | 2 |
| | Zinc oxide | 2 | 2 | 2 | 2 | 2 | 2 | 2 | 2 |
| | Sulfur | 2 | 2 | 2 | 2 | 2 | 2 | 2 | 2 |
| | Vulcanization accelerator TBBS | 1 | 1 | 1 | 1 | 1 | 1 | 1 | 1 |
| | Vulcanization accelerator DPG | — | — | 0.5 | — | — | — | — | — |

TABLE 4-continued

| | | Base tread | | | | | | | |
|---|---|---|---|---|---|---|---|---|---|
| | | Saponified natural rubber | | | | Deproteinized natural rubber | | | Natural rubber |
| | | Example | | | Comparative Example | Example | | Comparative Example | Comparative Example |
| | | 2-1 | 2-2 | 2-3 | 2-1 | 2-4 | 2-5 | 2-2 | 2-3 |
| Evaluation | Rolling resistance properties | 116 | 101 | 120 | 100 | 112 | 100 | 95 | 85 |
| | Handling stability | 6.25 | 7 | 6 | 6 | 6.25 | 6.75 | 6 | 6.25 |

Table 4 demonstrates that fuel economy, heat aging resistance, and handling stability were markedly improved in the examples in which the highly purified natural rubber 2A or 2C was used.

<Bead Apex>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt NR: RSS #3 grade SBR: Nipol 1502 (E-SBR, styrene content: 23.5% by mass, ML(1+4) at 100° C.: 52) available from Zeon Corporation Carbon black: Seast N (N330, $N_2SA$: 74 $m^2/g$, DBP oil absorption: 102 mL/100 g) available from Tokai Carbon Co., Ltd.

Silica: Silica 115Gr ($N_2SA$: 110 $m^2/g$) available from Rhodia Japan

Silane coupling agent: Si69 (bis(3-triethoxysilylpropyl) tetrasulfide) available from Evonik Degussa Resin: PR12686 (cashew oil-modified phenol resin) available from Sumitomo Bakelite Co., Ltd.

Oil: Diana Process P523 available from Idemitsu Kosan Co., Ltd.

Antioxidant: Antage RD (polymerized 2,2,4-trimethyl-1,2-dihydroquinoline) available from Kawaguchi Chemical Industry Co., LTD.

Zinc oxide: Zinc oxide #2 available from Mitsui Mining and Smelting Co., Ltd.

Stearic acid: stearic acid beads “Tsubaki” available from NOF Corporation

Sulfur: powdered sulfur available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 3A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 3A) was prepared.

Comparative Production Example 3B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 3B) was prepared.

Comparative Production Example 3C

A solid rubber (highly purified natural rubber 3C) was prepared as in Production Example 3A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 3D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 3D) was prepared.

Comparative Production Example 3E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 3E) was prepared.

Comparative Production Example 3F

A solid rubber (highly purified natural rubber 3F) was prepared as in Comparative Production Example 3E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 5 shows the results of the above-described evaluations performed on the prepared solid rubbers.

TABLE 5

| | Saponified natural rubber | | | Deproteinized natural rubber | | | |
|---|---|---|---|---|---|---|---|
| | Highly purified natural rubber 3A Production Example 3A | Highly purified natural rubber 3B Comparative Production Example 3B | Highly purified natural rubber 3C Comparative Production Example 3C | Highly purified natural rubber 3D Production Example 3D | Highly purified natural rubber 3E Comparative Production Example 3E | Highly purified natural rubber 3F Comparative Production Example 3F | Natural rubber RSS #3 — |
| pH | 5 | 8 | 8.5 | 4.9 | 8.1 | 9.5 | |
| Nitrogen content (% by mass) | 0.07 | 0.08 | 0.07 | 0.02 | 0.02 | 0.02 | 0.36 |

TABLE 5-continued

| | Saponified natural rubber | | | Deproteinized natural rubber | | | |
|---|---|---|---|---|---|---|---|
| | Highly purified natural rubber 3A Production Example 3A | Highly purified natural rubber 3B Comparative Production Example 3B | Highly purified natural rubber 3C Comparative Production Example 3C | Highly purified natural rubber 3D Production Example 3D | Highly purified natural rubber 3E Comparative Production Example 3E | Highly purified natural rubber 3F Comparative Production Example 3F | Natural rubber RSS #3 — |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 5 shows that the modified natural rubbers having a pH ranging from 2 to 7 were excellent in heat aging resistance as compared to the rubbers having a pH outside the range.

<Preparation of Unvulcanized Rubber Composition and Vulcanized Rubber Composition>

According to the formulations shown in Tables 6 and 7, the chemicals other than the sulfur and the vulcanization accelerator were kneaded using a 1.7-L Banbury mixer to give a kneaded mixture. Then, the sulfur and the vulcanization accelerator were kneaded with the kneaded mixture using an open roll mill to prepare an unvulcanized rubber composition.

Next, the unvulcanized rubber composition was pressed in a 1-mm-thick mold for 30 minutes at 150° C. to prepare a vulcanized rubber composition. The thus prepared unvulcanized rubber compositions and vulcanized rubber compositions were evaluated as follows. Tables 6 and 7 show the results.

<Fuel Economy (Rolling Resistance Index)>

The tan δ of the vulcanized rubber compositions was measured using a viscoelastic spectrometer VES (available from Iwamoto Seisakusho) at a temperature of 70° C., an initial strain of 10%, and a dynamic strain of 2%. The tan δ values are expressed as an index calculated using the equation below, wherein the value of Comparative Example 3-1 or 3-6 is set equal to 100. A higher index indicates better rolling resistance properties.

(Rolling resistance index)=(tan δ of Comparative Example 3-1 or 3-6)/(tan δ of each formulation)×100

<Processability Index: Measurement of Mooney Viscosity>

The Mooney viscosity of the prepared unvulcanized rubber compositions was measured at 130° C. in conformity with JIS K 6300. The Mooney viscosity ($ML_{1+4}$) values are expressed as an index (Mooney viscosity index) calculated using the equation below, wherein the value of Comparative Example 3-1 or 3-6 is set equal to 100. A higher index indicates a lower Mooney viscosity and better processability.

(Mooney viscosity index)=($ML_{1+4}$ of Comparative Example 3-1 or 3-6)/($ML_{1+4}$ of each formulation)×100

<Tensile Strength Index>

Tensile testing was performed using No. 3 dumbbell specimens in conformity with JIS K 6251 "Rubber, vulcanized or thermoplastics—Determination of tensile stress-strain properties" to measure the elongation at break (EB) and the tensile strength at break (TB) of the vulcanized rubber compositions. The EB×TB values of the formulations are expressed as an index calculated using the equation below, wherein the value of Comparative Example 3-1 or 3-6 is set equal to 100. A higher index indicates better tensile strength.

(Tensile strength index)=(EB×TB of each formulation)/(EB×TB of Comparative Example 3-1 or 3-6)×100

TABLE 6

| | | Bead apex containing carbon black | | | | | | |
|---|---|---|---|---|---|---|---|---|
| | | Saponified natural rubber | | | Deproteinized natural rubber | | | Natural rubber |
| | | Example | Comparative Example | | Example | Comparative Example | | Comparative Example |
| | | 3-1 | 3-1 | 3-2 | 3-2 | 3-3 | 3-4 | 3-5 |
| Formulation (parts by mass) | Highly purified natural rubber 3A | 80 | | | | | | |
| | Highly purified natural rubber 3B | | 80 | | | | | |
| | Highly purified natural rubber 3C | | | 80 | | | | |
| | Highly purified natural rubber 3D | | | | 80 | | | |
| | Highly purified natural rubber 3E | | | | | 80 | | |

TABLE 6-continued

Bead apex containing carbon black

| | | Saponified natural rubber | | | Deproteinized natural rubber | | | Natural rubber |
|---|---|---|---|---|---|---|---|---|
| | | Example | Comparative Example | | Example | Comparative Example | | Comparative Example |
| | | 3-1 | 3-1 | 3-2 | 3-2 | 3-3 | 3-4 | 3-5 |
| | Highly purified natural rubber 3F | | | | | | 80 | |
| | NR | | | | | | | 80 |
| | SBR | 20 | 20 | 20 | 20 | 20 | 20 | 20 |
| | Carbon black | 60 | 60 | 60 | 60 | 60 | 60 | 60 |
| | Stearic acid | 2 | 2 | 2 | 2 | 2 | 2 | 2 |
| | Zinc oxide | 4 | 4 | 4 | 4 | 4 | 4 | 4 |
| | Oil | 2 | 2 | 2 | 2 | 2 | 2 | 2 |
| | Resin | 10 | 10 | 10 | 10 | 10 | 10 | 10 |
| | Sulfur | 1 | 1 | 1 | 1 | 1 | 1 | 1 |
| | Vulcanization accelerator | 1 | 1 | 1 | 1 | 1 | 1 | 1 |
| Evaluation | Rolling resistance index | 107 | 100 | 97 | 104 | 97 | 96 | 92 |
| | Tensile strength index | 109 | 100 | 96 | 108 | 97 | 95 | 85 |
| | Processability index | 108 | 100 | 99 | 106 | 99 | 98 | 92 |

TABLE 7

Bead apex containing silica

| | | Saponified natural rubber | | | Deproteinized natural rubber | | | Natural rubber |
|---|---|---|---|---|---|---|---|---|
| | | Example | Comparative Example | | Example | Comparative Example | | Comparative Example |
| | | 3-3 | 3-6 | 3-7 | 3-4 | 3-8 | 3-9 | 3-10 |
| Formulation (parts by mass) | Highly purified natural rubber 3A | 70 | | | | | | |
| | Highly purified natural rubber 3B | | 70 | | | | | |
| | Highly purified natural rubber 3C | | | 70 | | | | |
| | Highly purified natural rubber 3D | | | | 70 | | | |
| | Highly purified natural rubber 3E | | | | | 70 | | |
| | Highly purified natural rubber 3F | | | | | | 70 | |
| | NR | | | | | | | 70 |
| | SBR | 30 | 30 | 30 | 30 | 30 | 30 | 30 |
| | Silica | 50 | 50 | 50 | 50 | 50 | 50 | 50 |
| | Coupling agent | 4 | 4 | 4 | 4 | 4 | 4 | 4 |
| | Stearic acid | 2 | 2 | 2 | 2 | 2 | 2 | 2 |
| | Zinc oxide | 4 | 4 | 4 | 4 | 4 | 4 | 4 |
| | Antioxidant | 1 | 1 | 1 | 1 | 1 | 1 | 1 |
| | Sulfur | 1 | 1 | 1 | 1 | 1 | 1 | 1 |
| | Vulcanization accelerator | 1 | 1 | 1 | 1 | 1 | 1 | 1 |
| Evaluation | Rolling resistance index | 106 | 100 | 98 | 105 | 99 | 97 | 94 |
| | Tensile strength index | 109 | 100 | 99 | 107 | 99 | 94 | 94 |
| | Processability index | 110 | 100 | 97 | 108 | 98 | 96 | 87 |

Tables 6 and 7 demonstrate that in the examples in which the highly purified natural rubber 3A or 3D was used, fuel economy, tensile strength, and heat aging resistance were markedly improved while excellent processability was obtained.

<Clinch Apex>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt NR: RSS #3 grade BR: Nipol 1220 (cis content: 96.5% by mass, vinyl content: 1% by mass) available from Zeon Corporation Carbon black: Seast N (N330, $N_2SA$: 74 $m^2/g$, DBP oil absorption: 102 mL/100 g) available from Tokai Carbon Co., Ltd.

Silica: Silica 115Gr ($N_2SA$: 110 $m^2/g$) available from Rhodia Japan

Silane coupling agent: Si69 (bis(3-triethoxysilylpropyl) tetrasulfide) available from Evonik Degussa Wax: Sunnoc wax available from Ouchi Shinko Chemical Industrial Co., Ltd.

Oil: Process X-140 available from JX Nippon Oil & Energy Corporation

Antioxidant: Antage RD (polymerized 2,2,4-trimethyl-1,2-dihydroquinoline) available from Kawaguchi Chemical Industry Co., LTD.

Zinc oxide: Zinc oxide #2 available from Mitsui Mining and Smelting Co., Ltd.

Stearic acid: stearic acid beads "Tsubaki" available from NOF Corporation

Sulfur: powdered sulfur available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 4A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 4A) was prepared.

Comparative Production Example 4B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 4B) was prepared.

Comparative Production Example 4C

A solid rubber (highly purified natural rubber 4C) was prepared as in Production Example 4A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 4D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 4D) was prepared.

Comparative Production Example 4E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 4E) was prepared.

Comparative Production Example 4F

A solid rubber (highly purified natural rubber 4F) was prepared as in Comparative Production Example 4E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 8 shows the results of the above-described evaluations performed on the prepared solid rubbers.

TABLE 8

| | Saponified natural rubber | | | Deproteinized natural rubber | | | |
|---|---|---|---|---|---|---|---|
| | Highly purified natural rubber 4A Production Example 4A | Highly purified natural rubber 4B Comparative Production Example 4B | Highly purified natural rubber 4C Comparative Production Example 4C | Highly purified natural rubber 4D Production Example 4D | Highly purified natural rubber 4E Comparative Production Example 4E | Highly purified natural rubber 4F Comparative Production Example 4F | Natural rubber RSS #3 — |
| pH | 5 | 8 | 8.5 | 4.9 | 8.1 | 9.5 | |
| Nitrogen content (% by mass) | 0.07 | 0.08 | 0.07 | 0.02 | 0.02 | 0.02 | 0.36 |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 8 shows that the modified natural rubbers having a pH ranging from 2 to 7 were excellent in heat aging resistance as compared to the rubbers having a pH outside the range.

<Preparation of Unvulcanized Rubber Composition and Vulcanized Rubber Composition>

According to the formulations shown in Tables 9 and 10, the chemicals other than the sulfur and the vulcanization accelerator were kneaded using a 1.7-L Banbury mixer to give a kneaded mixture. Then, the sulfur and the vulcanization accelerator were kneaded with the kneaded mixture using an open roll mill to prepare an unvulcanized rubber composition.

Next, the unvulcanized rubber composition was pressed in a 1-mm-thick mold for 30 minutes at 150° C. to prepare a vulcanized rubber composition. The thus prepared unvulcanized rubber compositions and vulcanized rubber compositions were evaluated as follows. Tables 9 and 10 show the results.

<Fuel Economy (Rolling Resistance Index)>

The tan δ of the vulcanized rubber compositions was measured using a viscoelastic spectrometer VES (available from Iwamoto Seisakusho) at a temperature of 70° C., an initial strain of 10%, and a dynamic strain of 2%. The tan δ values are expressed as an index calculated using the equation below, wherein the value of Comparative Example 4-1 or 4-6 is set equal to 100. A higher index indicates better rolling resistance properties.

(Rolling resistance index)=(tan δ of Comparative Example 4-1 or 4-6)/(tan δ of each formulation)×100

<Processability Index: Measurement of Mooney Viscosity>

The Mooney viscosity of the prepared unvulcanized rubber compositions was measured at 130° C. in conformity with JIS K 6300. The Mooney viscosity ($ML_{1+4}$) values are expressed as an index (Mooney viscosity index) calculated using the equation below, wherein the value of Comparative Example 4-1 or 4-6 is set equal to 100. A higher index indicates a lower Mooney viscosity and better processability.

(Mooney viscosity index)=($ML_{1+4}$ of Comparative Example 4-1 or 4-6)/($ML_{1+4}$ of each formulation)×100

<Abrasion Resistance Index>

Vulcanized rubber samples for Lambourn abrasion testing prepared from the vulcanized rubber compositions were abraded using a Lambourn abrasion tester under a load of 1.0 kg at room temperature, a slip ratio of 30%, and a measurement time of 2 minutes, and then measured for Lambourn abrasion loss. The volume losses of the formulations were calculated and expressed as an abrasion resistance index calculated using the equation below, wherein the value of Comparative Example 4-1 or 4-6 is set equal to 100. A higher abrasion resistance index indicates better abrasion resistance.

(Abrasion resistance index)=(Volume loss of Comparative Example 4-1 or 4-6)/(Volume loss of each formulation)×100

<Tensile Strength Index>

Tensile testing was performed using No. 3 dumbbell specimens in conformity with JIS K 6251 "Rubber, vulcanized or thermoplastics—Determination of tensile stress-strain properties" to measure the elongation at break (EB) and the tensile strength at break (TB) of the vulcanized rubber compositions. The EB×TB values of the formulations are expressed as an index calculated using the equation below, wherein the value of Comparative Example 4-1 or 4-6 is set equal to 100. A higher index indicates better tensile strength.

(Tensile strength index)=(EB×TB of each formulation)/(EB×TB of Comparative Example 4-1 or 4-6)×100

TABLE 9

| Clinch apex containing carbon black | | | | | | | | |
|---|---|---|---|---|---|---|---|---|
| | | Saponified natural rubber | | | Deproteinized natural rubber | | | Natural rubber |
| | | Example | Comparative Example | | Example | Comparative Example | | Comparative Example |
| | | 4-1 | 4-1 | 4-2 | 4-2 | 4-3 | 4-4 | 4-5 |
| Formulation (parts by mass) | Highly purified natural rubber 4A | 50 | | | | | | |
| | Highly purified natural rubber 4B | | 50 | | | | | |
| | Highly purified natural rubber 4C | | | 50 | | | | |
| | Highly purified natural rubber 4D | | | | 50 | | | |
| | Highly purified natural rubber 4E | | | | | 50 | | |
| | Highly purified natural rubber 4F | | | | | | 50 | |
| | NR | | | | | | | 50 |
| | BR | 50 | 50 | 50 | 50 | 50 | 50 | 50 |
| | Carbon black | 60 | 60 | 60 | 60 | 60 | 60 | 60 |
| | Oil | 8 | 8 | 8 | 8 | 8 | 8 | 8 |
| | Wax | 1 | 1 | 1 | 1 | 1 | 1 | 1 |
| | Stearic acid | 1 | 1 | 1 | 1 | 1 | 1 | 1 |
| | Zinc oxide | 4 | 4 | 4 | 4 | 4 | 4 | 4 |
| | Antioxidant | 1 | 1 | 1 | 1 | 1 | 1 | 1 |
| | Sulfur | 1.5 | 1.5 | 1.5 | 1.5 | 1.5 | 1.5 | 1.5 |
| | Vulcanization accelerator | 1.5 | 1.5 | 1.5 | 1.5 | 1.5 | 1.5 | 1.5 |
| Evaluation | Rolling resistance index | 105 | 100 | 98 | 102 | 97 | 95 | 91 |
| | Tensile strength index | 108 | 100 | 95 | 106 | 97 | 92 | 85 |

TABLE 9-continued

Clinch apex containing carbon black

| | Saponified natural rubber | | | Deproteinized natural rubber | | | Natural rubber |
|---|---|---|---|---|---|---|---|
| | Example | Comparative Example | | Example | Comparative Example | | Comparative Example |
| | 4-1 | 4-1 | 4-2 | 4-2 | 4-3 | 4-4 | 4-5 |
| Abrasion resistance index | 106 | 100 | 94 | 105 | 96 | 92 | 88 |
| Processability index | 105 | 100 | 99 | 104 | 99 | 98 | 90 |

TABLE 10

Clinch apex containing silica

| | | Saponified natural rubber | | | Deproteinized natural rubber | | | Natural rubber |
|---|---|---|---|---|---|---|---|---|
| | | Example | Comparative Example | | Example | Comparative Example | | Comparative Example |
| | | 4-3 | 4-6 | 4-7 | 4-4 | 4-8 | 4-9 | 4-10 |
| Formulation (parts by mass) | Highly purified natural rubber 4A | 50 | | | | | | |
| | Highly purified natural rubber 4B | | 50 | | | | | |
| | Highly purified natural rubber 4C | | | 50 | | | | |
| | Highly purified natural rubber 4D | | | | 50 | | | |
| | Highly purified natural rubber 4E | | | | | 50 | | |
| | Highly purified natural rubber 4F | | | | | | 50 | |
| | NR | | | | | | | 50 |
| | BR | 50 | 50 | 50 | 50 | 50 | 50 | 50 |
| | Silica | 40 | 40 | 40 | 40 | 40 | 40 | 40 |
| | Carbon black | 20 | 20 | 20 | 20 | 20 | 20 | 20 |
| | Coupling agent | 3 | 3 | 3 | 3 | 3 | 3 | 3 |
| | Oil | 8 | 8 | 8 | 8 | 8 | 8 | 8 |
| | Wax | 1 | 1 | 1 | 1 | 1 | 1 | 1 |
| | Stearic acid | 1 | 1 | 1 | 1 | 1 | 1 | 1 |
| | Zinc oxide | 4 | 4 | 4 | 4 | 4 | 4 | 4 |
| | Antioxidant | 1 | 1 | 1 | 1 | 1 | 1 | 1 |
| | Sulfur | 1.5 | 1.5 | 1.5 | 1.5 | 1.5 | 1.5 | 1.5 |
| | Vulcanization accelerator | 1.5 | 1.5 | 1.5 | 1.5 | 1.5 | 1.5 | 1.5 |
| Evaluation | Rolling resistance index | 108 | 100 | 98 | 106 | 99 | 97 | 94 |
| | Tensile strength index | 110 | 100 | 95 | 108 | 97 | 94 | 90 |
| | Abrasion resistance index | 107 | 100 | 98 | 105 | 99 | 97 | 93 |
| | Processability index | 107 | 100 | 97 | 107 | 98 | 85 | 80 |

Tables 9 and 10 demonstrate that in the examples in which the highly purified natural rubber 4A or 4D was used, fuel economy, tensile strength, abrasion resistance, and heat aging resistance were markedly improved while excellent processability was obtained.

<Innerliner>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt NR: RSS #3 grade Butyl-based rubber: Exxon chlorobutyl 1066 (chlorinated butyl rubber) available from Exxon Mobil Corporation ENR: ENR25 (epoxidation degree: 25 mol %) available from Kumpulan Guthrie Berhad Carbon black: Seast V (N660, $N_2SA$: 27 $m^2/g$) available from Tokai Carbon Co., Ltd.

Silica: Silica 115Gr ($N_2SA$: 110 $m^2/g$) available from Rhodia Japan

Silane coupling agent: Si266 (bis(3-triethoxysilylpropyl) disulfide) available from Evonik Degussa Antioxidant: Antage RD (polymerized 2,2,4-trimethyl-1,2-dihydroquinoline) available from Kawaguchi Chemical Industry Co., LTD.

Zinc oxide: Zinc oxide #2 available from Mitsui Mining and Smelting Co., Ltd.

Stearic acid: stearic acid beads “Tsubaki” available from NOF Corporation

Sulfur: powdered sulfur available from Tsurumi Chemical Industry Co., Ltd.

Vulcanization accelerator 1: Nocceler DM (di-2-benzothiazolyl disulfide) available from Ouchi Shinko Chemical Industrial Co., Ltd.

Vulcanization accelerator 2: Nocceler NS (N-tert-butyl-2-benzothiazolylsulfenamide) available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 5A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 5A) was prepared.

Comparative Production Example 5B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 5B) was prepared.

Comparative Production Example 5C

A solid rubber (highly purified natural rubber 5C) was prepared as in Production Example 5A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 5D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 5D) was prepared.

Comparative Production Example 5E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 5E) was prepared.

Comparative Production Example 5F

A solid rubber (highly purified natural rubber 5F) was prepared as in Comparative Production Example 5E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 11 shows the results of the above-described evaluations performed on the prepared solid rubbers.

TABLE 11

| | Saponified natural rubber | | | Deproteinized natural rubber | | | |
|---|---|---|---|---|---|---|---|
| | | | | | Highly purified | | |
| | Highly purified natural rubber 5A Production Example 5A | Highly purified natural rubber 5B Comparative Production Example 5B | Highly purified natural rubber 5C Comparative Production Example 5C | Highly purified natural rubber 5D Production Example 5D | natural rubber 5E Comparative Production Example 5E | Highly purified natural rubber 5F Comparative Production Example 5F | Natural rubber RSS #3 — |
| pH | 5 | 8 | 8.5 | 4.9 | 8.1 | 9.5 | |
| Nitrogen content (% by mass) | 0.07 | 0.08 | 0.07 | 0.02 | 0.02 | 0.02 | 0.36 |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 11 shows that the modified natural rubbers having a pH ranging from 2 to 7 were excellent in heat aging resistance as compared to the rubbers having a pH outside the range.

<Preparation of Unvulcanized Rubber Composition and Vulcanized Rubber Composition>

According to the formulations shown in Tables 12 and 13, the chemicals other than the sulfur and the vulcanization accelerator were kneaded using a 1.7-L Banbury mixer to give a kneaded mixture. Then, the sulfur and the vulcanization accelerator were kneaded with the kneaded mixture using an open roll mill to prepare an unvulcanized rubber composition.

Next, the unvulcanized rubber composition was pressed in a 1-mm-thick mold for 30 minutes at 150° C. to prepare a vulcanized rubber composition. The thus prepared unvulcanized rubber compositions and vulcanized rubber compositions were evaluated as follows. Tables 12 and 13 show the results.

<Fuel Economy (Rolling Resistance Index)>

The tan δ of the vulcanized rubber compositions was measured using a viscoelastic spectrometer VES (available from Iwamoto Seisakusho) at a temperature of 70° C., an initial strain of 10%, and a dynamic strain of 2%. The tan δ values are expressed as an index calculated using the equation below, wherein the value of Comparative Example 5-1 or 5-6 is set equal to 100. A higher index indicates better rolling resistance properties.

(Rolling resistance index)=(tan δ of Comparative Example 5-1 or 5-6)/(tan δ of each formulation)×100

<Processability Index: Measurement of Mooney Viscosity>

The Mooney viscosity of the prepared unvulcanized rubber compositions was measured at 130° C. in conformity with JIS K 6300. The Mooney viscosity ($ML_{1+4}$) values are expressed as an index (Mooney viscosity index) calculated using the equation below, wherein the value of Comparative Example 5-1 or 5-6 is set equal to 100. A higher index indicates a lower Mooney viscosity and better processability.

(Mooney viscosity index)=($ML_{1+4}$ of Comparative Example 5-1 or 5-6)/($ML_{1+4}$ of each formulation)×100

<Tensile Strength Index>

Tensile testing was performed using No. 3 dumbbell specimens in conformity with JIS K 6251 "Rubber, vulcanized or thermoplastics—Determination of tensile stress-strain properties" to measure the elongation at break (EB) and the tensile strength at break (TB) of the vulcanized rubber compositions. The EB×TB values of the formulations are expressed as an index calculated using the equation below, wherein the value of Comparative Example 5-1 or 5-6 is set equal to 100. A higher index indicates better tensile strength.

(Tensile strength index)=(EB×TB of each formulation)/(EB×TB of Comparative Example 5-1 or 5-6)×100

<Index of Resistance to Air Permeation>

Rubber specimens having a diameter of 90 mm and a thickness of 1 mm were prepared from the vulcanized rubber compositions. The air permeability coefficients (cc·cm/cm$^2$·sec/cmHg) of the specimens were determined in accordance with ASTM D-1434-75M and expressed as an index (index of resistance to air permeation) calculated using the equation below, wherein Comparative Example 5-1 or 5-6 is used as a reference (=100). A higher index indicates lower air permeation and better resistance to air permeation.

(Index of resistance to air permeation)=(Air permeability coefficient of Comparative Example 5-1 or 5-6)/(Air permeability coefficient of each formulation)×100

TABLE 12

| Innerliner containing butyl rubber | | | | | | | | |
|---|---|---|---|---|---|---|---|---|
| | | Saponified natural rubber | | | Deproteinized natural rubber | | | Natural rubber Comparative |
| | | Example | Comparative Example | | Example | Comparative Example | | Example |
| | | 5-1 | 5-1 | 5-2 | 5-2 | 5-3 | 5-4 | 5-5 |
| Formulation (parts by mass) | Highly purified natural rubber 5A | 30 | | | | | | |
| | Highly purified natural rubber 5B | | 30 | | | | | |
| | Highly purified natural rubber 5C | | | 30 | | | | |
| | Highly purified natural rubber 5D | | | | 30 | | | |
| | Highly purified natural rubber 5E | | | | | 30 | | |
| | Highly purified natural rubber 5F | | | | | | 30 | |
| | NR | | | | | | | 30 |
| | Butyl-based rubber | 70 | 70 | 70 | 70 | 70 | 70 | 70 |
| | Carbon black | 50 | 50 | 50 | 50 | 50 | 50 | 50 |
| | Stearic acid | 2 | 2 | 2 | 2 | 2 | 2 | 2 |
| | Zinc oxide | 4 | 4 | 4 | 4 | 4 | 4 | 4 |
| | Antioxidant | 1 | 1 | 1 | 1 | 1 | 1 | 1 |
| | Sulfur | 1 | 1 | 1 | 1 | 1 | 1 | 1 |
| | Vulcanization accelerator 1 | 1 | 1 | 1 | 1 | 1 | 1 | 1 |
| Evaluation | Rolling resistance index | 104 | 100 | 98 | 103 | 99 | 98 | 96 |
| | Tensile strength index | 107 | 100 | 97 | 104 | 97 | 96 | 92 |
| | Index of resistance to air permeation | 109 | 100 | 98 | 108 | 96 | 96 | 82 |
| | Processability index | 105 | 100 | 99 | 104 | 98 | 98 | 95 |

TABLE 13

| Innerliner containing epoxidized natural rubber | | | | | | | | | | |
|---|---|---|---|---|---|---|---|---|---|---|
| | | Saponified natural rubber | | | Deproteinized natural rubber | | | Natural rubber | | Epoxidized natural rubber |
| | | Example | Comparative Example | | Example | Comparative Example | | Comparative Example | | Comparative Example |
| | | 5-3 | 5-6 | 5-7 | 5-4 | 5-8 | 5-9 | 5-10 | 5-11 | 5-12 |
| Formulation (parts by mass) | Highly purified natural rubber 5A | 50 | | | | | | | | |
| | Highly purified natural rubber 5B | | 50 | | | | | | | |
| | Highly purified natural rubber 5C | | | 50 | | | | | | |
| | Highly purified natural rubber 5D | | | | 50 | | | | | |
| | Highly purified natural rubber 5E | | | | | 50 | | | | |
| | Highly purified natural rubber 5F | | | | | | 50 | | | |
| | NR | | | | | | | 50 | 100 | |
| | ENR | 50 | 50 | 50 | 50 | 50 | 50 | 50 | | 100 |
| | Silica | 50 | 50 | 50 | 50 | 50 | 50 | 50 | 50 | 50 |
| | Silane coupling agent | 4 | 4 | 4 | 4 | 4 | 4 | 4 | 4 | 4 |
| | Stearic acid | 2 | 2 | 2 | 2 | 2 | 2 | 2 | 2 | 2 |
| | Zinc oxide | 4 | 4 | 4 | 4 | 4 | 4 | 4 | 4 | 4 |
| | Antioxidant | 1 | 1 | 1 | 1 | 1 | 1 | 1 | 1 | 1 |
| | Sulfur | 1 | 1 | 1 | 1 | 1 | 1 | 1 | 1 | 1 |
| | Vulcanization accelerator 2 | 1 | 1 | 1 | 1 | 1 | 1 | 1 | 1 | 1 |
| Evaluation | Rolling resistance index | 104 | 100 | 99 | 102 | 99 | 97 | 95 | 92 | 106 |
| | Tensile strength index | 108 | 100 | 100 | 105 | 99 | 98 | 95 | 87 | 108 |
| | Index of resistance to air permeation | 109 | 100 | 99 | 107 | 99 | 98 | 96 | 90 | 109 |
| | Processability index | 110 | 100 | 97 | 108 | 98 | 96 | 92 | 102 | 85 |

Tables 12 and 13 demonstrate that in the examples in which the highly purified natural rubber 5A or 5D was used, fuel economy, tensile strength, resistance to air permeation, and heat aging resistance were markedly improved while excellent processability was obtained.

<Undertread>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt

NR: TSR20

Carbon black: DIABLACK LH (N326, $N_2SA$: 84 $m^2/g$) available from Mitsubishi Chemical Corporation Silica: Silica 115Gr ($N_2SA$: 110 $m^2/g$) available from Rhodia Japan Silane coupling agent: Si266 (bis(3-triethoxysilylpropyl) disulfide) available from Evonik Degussa Oil: Diana Process NH-70S available from Idemitsu Kosan Co., Ltd.

Antioxidant: Nocrac RD (poly(2,2,4-trimethyl-1,2-dihydroquinoline)) available from Ouchi Shinko Chemical Industrial Co., Ltd.

Zinc oxide: Zinc oxide #2 available from Mitsui Mining and Smelting Co., Ltd.

Stearic acid: stearic acid beads "Tsubaki" available from NOF Corporation

Sulfur: Crystex HSOT20 (insoluble sulfur containing 80% by mass of sulfur and 20% by mass of oil) available from Flexsys Vulcanization accelerator 1: Nocceler NS available from Ouchi Shinko Chemical Industrial Co., Ltd.

Vulcanization accelerator 2: Soxinol D available from Sumitomo Chemical Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 6A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 3 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 6A) was prepared.

Comparative Production Example 6B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 12 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed five times, followed by drying for 4 hours at 90° C. In this manner, a solid rubber (highly purified natural rubber 6B) was prepared.

Production Example 6C

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 3 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 6C) was prepared.

Table 14 shows the results of the above-described evaluations performed on the prepared solid rubbers.

TABLE 14

| | Saponified natural rubber | | Deproteinized natural rubber | |
|---|---|---|---|---|
| | Highly purified natural rubber 6A Production Example 6A | Highly purified natural rubber 6B Comparative Production Example 6B | Highly purified natural rubber 6C Production Example 6C | Natural rubber TSR20 — |
| pH | 5.6 | 8 | 5.8 | 6.2 |
| Nitrogen content (% by mass) | 0.07 | 0.08 | 0.07 | 0.35 |
| Phosphorus content (ppm) | 80 | 85 | 125 | 560 |
| Gel content (% by mass) | 7 | 6 | 7.2 | 28 |
| Mooney viscosity | 58 | 56 | 59 | 88 |
| Heat aging resistance (%) | 103 | 23 | 96 | 108 |

Table 14 shows that the modified natural rubbers having a pH ranging from 2 to 7 were excellent in heat aging resistance as compared to the rubbers having a pH outside the range.

<Preparation of Unvulcanized Rubber Composition and Vulcanized Rubber Composition>

According to the formulations shown in Table 15, the chemicals other than the sulfur and the vulcanization accelerators were kneaded using a 1.7-L Banbury mixer to give a kneaded mixture. Then, the sulfur and the vulcanization accelerator(s) were kneaded with the kneaded mixture using an open roll mill to prepare an unvulcanized rubber composition.

Next, the unvulcanized rubber composition was formed into a 2.1 mm sheet, and then vulcanized for 30 minutes at 150° C. to prepare a 2 mm vulcanized rubber composition. The thus prepared unvulcanized rubber compositions and vulcanized rubber compositions were evaluated as follows. Table 15 shows the results.

<Fuel Economy (Rolling Resistance Index)>

The tan δ of the vulcanized rubber compositions was measured using a viscoelastic spectrometer VES (available from Iwamoto Seisakusho) at a temperature of 70° C., an initial strain of 10%, and a dynamic strain of 2%. The tan δ values are expressed as an index calculated using the equation below, wherein the value of Comparative Example 6-1 is set equal to 100. A lower index indicates better rolling resistance properties.

(Rolling resistance index)=(tan δ of each formulation)/(tan δ of Comparative Example 6-1)×100

Oil: Diana Process oil PS323 available from Idemitsu Kosan Co., Ltd.

Organic acid cobalt salt: cost-F (cobalt stearate, cobalt content: 9.5% by mass) available from DIC Corporation Zinc oxide: Zinc oxide #2 available from Mitsui Mining and Smelting Co., Ltd.

Stearic acid: stearic acid beads "Tsubaki" available from NOF Corporation

Antioxidant: Nocrac 6C (N-phenyl-N'-(1,3-dimethylbutyl)-p-phenylenediamine, 6PPD) available from Ouchi Shinko Chemical Industrial Co., Ltd.

TABLE 15

| Undertread | | Saponified natural rubber | | | | Deproteinized natural rubber | | Natural rubber | |
|---|---|---|---|---|---|---|---|---|---|
| | | Example | | | Comparative Example | Example | | Comparative Example | |
| | | 6-1 | 6-2 | 6-3 | 6-1 | 6-4 | 6-5 | 6-2 | 6-3 |
| Formulation (parts by mass) | Highly purified natural rubber 6A | 80 | 80 | 100 | — | — | — | — | — |
| | Highly purified natural rubber 6B | — | — | — | 100 | — | — | — | — |
| | Highly purified natural rubber 6C | — | — | — | — | 80 | 80 | — | — |
| | NR | 20 | 20 | — | — | 20 | 20 | 100 | 100 |
| | Carbon black | 40 | — | 40 | 40 | 40 | — | 40 | — |
| | Silica | — | 45 | — | — | — | 45 | — | 45 |
| | Silane coupling agent | — | 3.6 | — | — | — | 3.6 | — | 3.6 |
| | Oil | 5 | 5 | 5 | 5 | 5 | 5 | 5 | 5 |
| | Antioxidant | 2 | 2 | 2 | 2 | 2 | 2 | 2 | 2 |
| | Stearic acid | 2 | 2 | 2 | 2 | 2 | 2 | 2 | 2 |
| | Zinc oxide | 2 | 2 | 2 | 2 | 2 | 2 | 2 | 2 |
| | Sulfur | 2 | 2 | 2 | 2 | 2 | 2 | 2 | 2 |
| | Vulcanization accelerator 1 | 1 | 1 | 1 | 1 | 1 | 1 | 1 | 1 |
| | Vulcanization accelerator 2 | — | 0.5 | — | — | — | 0.5 | — | 0.5 |
| Evaluation | Rolling resistance index | 89 | 88 | 85 | 100 | 94 | 92 | 105 | 100 |

Table 15 demonstrates that fuel economy and heat aging resistance were markedly improved in the examples in which the highly purified natural rubber 6A or 6C was used.

<Breaker Topping>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt NR: RSS #3 grade Carbon black: N550 ($N_2SA$:42 $m^2/g$, average particle size: 48 nm, DBP oil absorption: 113 mL/100 g) available from Cabot Japan K. K.

Sulfur: powdered sulfur available from Tsurumi Chemical Industry Co., Ltd.

Vulcanization accelerator: Nocceler DZ available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 7A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 7A) was prepared.

Comparative Production Example 7B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 7B) was prepared.

Comparative Production Example 7C

A solid rubber (highly purified natural rubber 7C) was prepared as in Production Example 7A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 7D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 7D) was prepared.

Comparative Production Example 7E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 7E) was prepared.

Comparative Production Example 7F

A solid rubber (highly purified natural rubber 7F) was prepared as in Comparative Production Example 7E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 16 shows the results of the above-described evaluations performed on the prepared solid rubbers.

TABLE 16

| | Saponified natural rubber | | | Deproteinized natural rubber | | | |
|---|---|---|---|---|---|---|---|
| | Highly purified natural rubber 7A Production Example 7A | Highly purified natural rubber 7B Comparative Production Example 7B | Highly purified natural rubber 7C Comparative Production Example 7C | Highly purified natural rubber 7D Production Example 7D | Highly purified natural rubber 7E Comparative Production Example 7E | Highly purified natural rubber 7F Comparative Production Example 7F | Natural rubber RSS #3 — |
| pH | 5 | 8 | 8.5 | 4.9 | 8.1 | 9.5 | — |
| Nitrogen content (% by mass) | 0.07 | 0.08 | 0.07 | 0.02 | 0.02 | 0.02 | 0.36 |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 16 shows that the modified natural rubbers having a pH ranging from 2 to 7 were excellent in heat aging resistance as compared to the rubbers having a pH outside the range.

<Preparation of Unvulcanized Rubber Composition and Vulcanized Rubber Composition>

According to the formulations shown in Table 17, the chemicals other than the sulfur and the vulcanization accelerator were kneaded using a 1.7-L Banbury mixer to give a kneaded mixture. Then, the sulfur and the vulcanization accelerator were kneaded with the kneaded mixture using an open roll mill to prepare an unvulcanized rubber composition.

Next, the unvulcanized rubber composition was pressed in a 2-mm-thick mold for 30 minutes at 150° C. to prepare a vulcanized rubber composition. The thus prepared unvulcanized rubber compositions and vulcanized rubber compositions were evaluated as follows. Table 17 shows the results.

<Fuel Economy (Rolling Resistance Index)>

The tan δ of the vulcanized rubber compositions was measured using a viscoelastic spectrometer VES (available from Iwamoto Seisakusho) at a temperature of 70° C., an initial strain of 10%, and a dynamic strain of 2%. The tan δ values are expressed as an index calculated using the equation below, wherein the value of Comparative Example 7-1 is set equal to 100. A higher index indicates better rolling resistance properties.

(Rolling resistance index)=(tan δ of Comparative Example 7-1)/(tan δ of each formulation)×100

<Processability Index: Measurement of Mooney Viscosity>

The Mooney viscosity of the prepared unvulcanized rubber compositions was measured at 130° C. in conformity with JIS K 6300. The Mooney viscosity ($ML_{1+4}$) values are expressed as an index (Mooney viscosity index) calculated using the equation below, wherein the value of Comparative Example 7-1 is set equal to 100. A higher index indicates a lower Mooney viscosity and better processability.

(Mooney viscosity index)=($ML_{1+4}$ of Comparative Example 7-1)/($ML_{1+4}$ of each formulation)×100

<Tensile Strength Index>

Tensile testing was performed using No. 3 dumbbell specimens in conformity with JIS K 6251 "Rubber, vulcanized or thermoplastics—Determination of tensile stress-strain properties" to measure the elongation at break (EB) and the tensile strength at break (TB) of the vulcanized rubber compositions. The EB×TB values of the formulations are expressed as an index calculated using the equation below, wherein the value of Comparative Example 7-1 is set equal to 100. A higher index indicates better tensile strength.

(Tensile strength index)=(EB×TB of each formulation)/(EB×TB of Comparative Example 7-1)×100

TABLE 17

| | | Breaker topping | | | | | | |
|---|---|---|---|---|---|---|---|---|
| | | Saponified natural rubber | | | Deproteinized natural rubber | | | Natural rubber |
| | | Example | Comparative Example | | Example | Comparative Example | | Comparative Example |
| | | 7-1 | 7-1 | 7-2 | 7-2 | 7-3 | 7-4 | 7-5 |
| Formulation (parts by mass) | Highly purified natural rubber 7A | 100 | | | | | | |
| | Highly purified natural rubber 7B | | 100 | | | | | |

TABLE 17-continued

| Breaker topping | | Saponified natural rubber | | | Deproteinized natural rubber | | | Natural rubber |
|---|---|---|---|---|---|---|---|---|
| | | Example | Comparative Example | | Example | Comparative Example | | Comparative Example |
| | | 7-1 | 7-1 | 7-2 | 7-2 | 7-3 | 7-4 | 7-5 |
| | Highly purified natural rubber 7C | | | 100 | | | | |
| | Highly purified natural rubber 7D | | | | 100 | | | |
| | Highly purified natural rubber 7E | | | | | 100 | | |
| | Highly purified natural rubber 7F | | | | | | 100 | |
| | NR | | | | | | | 100 |
| | Carbon black | 60 | 60 | 60 | 60 | 60 | 60 | 60 |
| | Organic acid cobalt salt | 2 | 2 | 2 | 2 | 2 | 2 | 2 |
| | Stearic acid | 2 | 2 | 2 | 2 | 2 | 2 | 2 |
| | Zinc oxide | 6 | 6 | 6 | 6 | 6 | 6 | 6 |
| | Antioxidant | 2 | 2 | 2 | 2 | 2 | 2 | 2 |
| | Process oil | 5 | 5 | 5 | 5 | 5 | 5 | 5 |
| | Sulfur | 5 | 5 | 5 | 5 | 5 | 5 | 5 |
| | Vulcanization accelerator | 1 | 1 | 1 | 1 | 1 | 1 | 1 |
| Evaluation | Rolling resistance index | 108 | 100 | 97 | 105 | 97 | 96 | 92 |
| | Processability index | 112 | 100 | 97 | 109 | 95 | 95 | 80 |
| | Tensile strength index | 103 | 100 | 99 | 102 | 98 | 97 | 95 |

Table 17 demonstrates that in the examples in which the highly purified natural rubber 7A or 7D was used, fuel economy, tensile strength, and heat aging resistance were markedly improved while excellent processability was obtained.

<Ply Topping>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt NR: RSS #3 grade SBR: Nipol 1502 (E-SBR, styrene content: 23.5% by mass, vinyl content: 18% by mass) available from Zeon Corporation Carbon black: N550 ($N_2SA$: 42 $m^2/g$, average particle size: 48 nm, DBP oil absorption: 113 mL/100 g) available from Cabot Japan K. K.

Oil: Diana Process oil PS323 available from Idemitsu Kosan Co., Ltd.

Zinc oxide: Zinc oxide #2 available from Mitsui Mining and Smelting Co., Ltd.

Stearic acid: stearic acid beads “Tsubaki” available from NOF Corporation

Sulfur: powdered sulfur available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 8A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 8A) was prepared.

Comparative Production Example 8B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 8B) was prepared.

Comparative Production Example 8C

A solid rubber (highly purified natural rubber 8C) was prepared as in Production Example 8A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 8D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 8D) was prepared.

Comparative Production Example 8E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 8E) was prepared.

Comparative Production Example 8F

A solid rubber (highly purified natural rubber 8F) was prepared as in Comparative Production Example 8E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 18 shows the results of the above-described evaluations performed on the prepared solid rubbers.

TABLE 18

|  | Saponified natural rubber | | | Deproteinized natural rubber | | | |
| --- | --- | --- | --- | --- | --- | --- | --- |
|  | Highly purified natural rubber 8A Production Example 8A | Highly purified natural rubber 8B Comparative Production Example 8B | Highly purified natural rubber 8C Comparative Production Example 8C | Highly purified natural rubber 8D Production Example 8D | Highly purified natural rubber 8E Comparative Production Example 8E | Highly purified natural rubber 8F Comparative Production Example 8F | Natural rubber RSS #3 |
| pH | 5 | 8 | 8.5 | 4.9 | 8.1 | 9.5 | — |
| Nitrogen content (% by mass) | 0.07 | 0.08 | 0.07 | 0.02 | 0.02 | 0.02 | 0.36 |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 18 shows that the modified natural rubbers having a pH ranging from 2 to 7 were excellent in heat aging resistance as compared to the rubbers having a pH outside the range.

<Preparation of Unvulcanized Rubber Composition and Vulcanized Rubber Composition>

According to the formulations shown in Table 19, the chemicals other than the sulfur and the vulcanization accelerator were kneaded using a 1.7-L Banbury mixer to give a kneaded mixture. Then, the sulfur and the vulcanization accelerator were kneaded with the kneaded mixture using an open roll mill to prepare an unvulcanized rubber composition.

Next, the unvulcanized rubber composition was pressed in a 2-mm-thick mold for 30 minutes at 150° C. to prepare a vulcanized rubber composition. The thus prepared unvulcanized rubber compositions and vulcanized rubber compositions were evaluated as follows. Table 19 shows the results.

<Fuel Economy (Rolling Resistance Index)>

The tan δ of the vulcanized rubber compositions was measured using a viscoelastic spectrometer VES (available from Iwamoto Seisakusho) at a temperature of 70° C., an initial strain of 10%, and a dynamic strain of 2%. The tan δ values are expressed as an index calculated using the equation below, wherein the value of Comparative Example 8-1 is set equal to 100. A higher index indicates better rolling resistance properties.

(Rolling resistance index)=(tan δ of Comparative Example 8-1)/(tan δ of each formulation)×100

<Processability Index: Measurement of Mooney Viscosity>

The Mooney viscosity of the prepared unvulcanized rubber compositions was measured at 130° C. in conformity with JIS K 6300. The Mooney viscosity ($ML_{1+4}$) values are expressed as an index (Mooney viscosity index) calculated using the equation below, wherein the value of Comparative Example 8-1 is set equal to 100. A higher index indicates a lower Mooney viscosity and better processability.

(Mooney viscosity index)=($ML_{1+4}$ of Comparative Example 8-1)/($ML_{1+4}$ of each formulation)×100

<Tensile Strength Index>

Tensile testing was performed using No. 3 dumbbell specimens in conformity with JIS K 6251 "Rubber, vulcanized or thermoplastics—Determination of tensile stress-strain properties" to measure the elongation at break (EB) and the tensile strength at break (TB) of the vulcanized rubber compositions. The EB×TB values of the formulations are expressed as an index calculated using the equation below, wherein the value of Comparative Example 8-1 is set equal to 100. A higher index indicates better tensile strength.

(Tensile strength index)=(EB×TB of each formulation)/(EB×TB of Comparative Example 8-1)×100

<Adhesive Strength Index>

Eight cords were disposed at equal intervals of 10 mm, and then a 0.7 mm-thick topping rubber sheet (the unvulcanized rubber composition) was press-bonded to both sides of the cords. After the resulting rubberized cords were stored at 60% humidity, two rubberized cord sheets were attached to each other at an angle of 90 degrees, and then a reinforcing rubber was press-bonded to both sides of the stack. The resulting bonded product was shaped into a rectangle to match the shape of a mold for vulcanization. After the bonded product was vulcanized in the mold at 165° C. for 20 minutes, a slit was formed between the two bonded rubberized cord sheets in the vulcanized product, and then the sheets were pulled at 180 degrees at a rate of 50 mm/min using a tensile tester available from Instron to evaluate the peel force (kN/25 mm) between the rubberized cords. The results are expressed as an index, with the peel force of Comparative Example 8-1 set equal to 100. A higher index indicates better adhesion between the cord and the topping rubber and higher durability.

TABLE 19

| Ply topping | | | | | | | | |
|---|---|---|---|---|---|---|---|---|
| | | Saponified natural rubber | | | Deproteinized natural rubber | | | Natural rubber |
| | | Example | Comparative Example | | Example | Comparative Example | | Comparative Example |
| | | 8-1 | 8-1 | 8-2 | 8-2 | 8-3 | 8-4 | 8-5 |
| Formulation (parts by mass) | Highly purified natural rubber 8A | 70 | | | | | | |
| | Highly purified natural rubber 8B | | 70 | | | | | |
| | Highly purified natural rubber 8C | | | 70 | | | | |
| | Highly purified natural rubber 8D | | | | 70 | | | |
| | Highly purified natural rubber 8E | | | | | 70 | | |
| | Highly purified natural rubber 8F | | | | | | 70 | |
| | NR | | | | | | | 70 |
| | SBR | 30 | 30 | 30 | 30 | 30 | 30 | 30 |
| | Carbon black | 50 | 50 | 50 | 50 | 50 | 50 | 50 |
| | Stearic acid | 2 | 2 | 2 | 2 | 2 | 2 | 2 |
| | Zinc oxide | 4 | 4 | 4 | 4 | 4 | 4 | 4 |
| | Process oil | 6 | 6 | 6 | 6 | 6 | 6 | 6 |
| | Sulfur | 3 | 3 | 3 | 3 | 3 | 3 | 3 |
| | Vulcanization accelerator | 1 | 1 | 1 | 1 | 1 | 1 | 1 |
| Evaluation | Rolling resistance index | 107 | 100 | 97 | 104 | 97 | 96 | 92 |
| | Processability index | 109 | 100 | 98 | 108 | 96 | 96 | 82 |
| | Adhesion strength index | 102 | 100 | 100 | 102 | 98 | 98 | 96 |
| | Tensile strength index | 104 | 100 | 98 | 103 | 98 | 96 | 92 |

Table 19 demonstrates that in the examples in which the highly purified natural rubber 8A or 8D was used, fuel economy, tensile strength, and heat aging resistance were markedly improved while excellent processability and excellent adhesive strength were obtained.

<Tread>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt

NR: TSR

SBR: Buna VSL 2525-0 (styrene content: 25% by mass, vinyl content: 25% by mass) available from LANXESS Carbon black: DIABLACK I (ISAF, $N_2SA$: 114 $m^2/g$, average particle size: 23 nm, DBP oil absorption: 114 mL/100 g) available from Mitsubishi Chemical Corporation Silica: Ultrasil VN3 ($N_2SA$: 175 $m^2/g$) available from Evonik Degussa Silane coupling agent: Si69 available from Evonik Degussa Oil: Process X-140 (aromatic process oil) available from JX Nippon Oil & Energy Corporation Wax: Ozoace 0355 available from Nippon Seiro Co., Ltd.

Zinc oxide: Zinc oxide #2 available from Mitsui Mining and Smelting Co., Ltd.

Stearic acid: stearic acid beads "Tsubaki" available from NOF Corporation

Antioxidant: Nocrac 6C (N-phenyl-N'-(1,3-dimethylbutyl)-p-phenylenediamine, 6PPD) available from Ouchi Shinko Chemical Industrial Co., Ltd.

Sulfur: powdered sulfur available from Tsurumi Chemical Industry Co., Ltd.

Vulcanization accelerator: Nocceler NS available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 9A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 9A) was prepared.

Comparative Production Example 9B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 9B) was prepared.

Comparative Production Example 9C

A solid rubber (highly purified natural rubber 9C) was prepared as in Production Example 9A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 9D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 9D) was prepared.

Comparative Production Example 9E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 9E) was prepared.

Comparative Production Example 9F

A solid rubber (highly purified natural rubber 9F) was prepared as in Comparative Production Example 9E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 20 shows the results of the above-described evaluations performed on the prepared solid rubbers.

<Fuel Economy (Rolling Resistance Index)>

Rolling resistance was measured using a rolling resistance tester by running the test tire mounted on a 15×6 JJ rim at an internal pressure of 230 kPa, a load of 3.43 kN, and a speed of 80 km/h. The results are expressed as an index, with the value of Comparative Example 9-1 set equal to 100. A higher index indicates better fuel economy.

<Wet-Grip Performance Index>

The test tires were mounted on each wheel of a car (a front-engine, front-wheel-drive (FF) car, 2000 cc, made in Japan), and the braking distance from an initial speed of 100 km/h on a wet asphalt road was determined. The results are expressed as an index. A higher index indicates better wet-skid performance (wet-grip performance). The index was determined using the following equation.

TABLE 20

| | Saponified natural rubber | | | Deproteinized natural rubber | | | |
|---|---|---|---|---|---|---|---|
| | Highly purified natural rubber 9A Production Example 9A | Highly purified natural rubber 9B Comparative Production Example 9B | Highly purified natural rubber 9C Comparative Production Example 9C | Highly purified natural rubber 9D Production Example 9D | Highly purified natural rubber 9E Comparative Production Example 9E | Highly purified natural rubber 9F Comparative Production Example 9F | Natural rubber RSS #3 — |
| pH | 5 | 8 | 8.5 | 4.9 | 8.1 | 9.5 | — |
| Nitrogen content (% by mass) | 0.07 | 0.08 | 0.07 | 0.02 | 0.02 | 0.02 | 0.36 |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 20 shows that the modified natural rubbers having a pH ranging from 2 to 7 were excellent in heat aging resistance as compared to the rubbers having a pH outside the range.

<Preparation of Test Tire>

According to the formulations shown in Table 21, the chemicals other than the sulfur and the vulcanization accelerator were kneaded using a 1.7-L Banbury mixer. Next, the sulfur and the vulcanization accelerator were kneaded with the kneaded mixture using a roll to prepare an unvulcanized rubber composition. The unvulcanized rubber composition was formed into the shape of a base tread and assembled with other tire components on a tire building machine to build an unvulcanized tire, which was then vulcanized at 170° C. for 10 minutes to prepare a test tire (size: 195/65R15, a tire for passenger vehicles).

The thus prepared test tires were evaluated as follows. Table 21 shows the results.

Wet-skid performance=(Braking distance of Comparative Example 9-1)/(Braking distance of each formulation)×100

<Abrasion Resistance Index>

The test tires were mounted on a front-engine, front-wheel-drive (FF) car made in Japan. After a mileage of 8,000 km, the groove depth in the tire tread was measured. The distance at which the tire groove depth decreases by 1 mm was determined and expressed as an index calculated using the equation below. A higher index indicates better abrasion resistance.

Abrasion resistance index=(Distance at which the groove depth decreases by 1 mm)/(Distance at which the groove depth of the tire of Comparative Example 9-1 decreases by 1 mm)×100

TABLE 21

| | | Tread | | | | | | | | |
|---|---|---|---|---|---|---|---|---|---|---|
| | | Saponified natural rubber | | | | | Deproteinized natural rubber | | | Natural rubber |
| | | Example | | Comparative Example | | | Example | Comparative Example | | Comparative Example |
| | | 9-1 | 9-2 | 9-1 | 9-2 | 9-3 | 9-3 | 9-4 | 9-5 | 9-6 |
| Formulation (parts by mass) | Highly purified natural rubber 9A | 30 | 30 | | | | | | | |

TABLE 21-continued

| Tread | | Saponified natural rubber | | | | | Deproteinized natural rubber | | | Natural rubber |
|---|---|---|---|---|---|---|---|---|---|---|
| | | Example | | Comparative Example | | | Example | Comparative Example | | Comparative Example |
| | | 9-1 | 9-2 | 9-1 | 9-2 | 9-3 | 9-3 | 9-4 | 9-5 | 9-6 |
| | Highly purified natural rubber 9B | | | 30 | | 30 | | | | |
| | Highly purified natural rubber 9C | | | | 30 | | | | | |
| | Highly purified natural rubber 9D | | | | | | 30 | | | |
| | Highly purified natural rubber 9E | | | | | | | 30 | | |
| | Highly purified natural rubber 9F | | | | | | | | 30 | |
| | NR | | | | | | | | | 30 |
| | SBR | 70 | 70 | 70 | 70 | 70 | 70 | 70 | 70 | 70 |
| | Carbon black | 10 | 80 | 10 | 10 | 80 | 10 | 10 | 10 | 10 |
| | Silica | 80 | 10 | 80 | 80 | 10 | 80 | 80 | 80 | 80 |
| | Silane coupling agent | 4 | 1 | 4 | 4 | 1 | 4 | 4 | 4 | 4 |
| | Stearic acid | 2 | 2 | 2 | 2 | 2 | 2 | 2 | 2 | 2 |
| | Zinc oxide | 2 | 2 | 2 | 2 | 2 | 2 | 2 | 2 | 2 |
| | Antioxidant | 1.5 | 1.5 | 1.5 | 1.5 | 1.5 | 1.5 | 1.5 | 1.5 | 1.5 |
| | Wax | 1.5 | 1.5 | 1.5 | 1.5 | 1.5 | 1.5 | 1.5 | 1.5 | 1.5 |
| | Aromatic oil | 15 | 15 | 15 | 15 | 15 | 15 | 15 | 15 | 15 |
| | Sulfur | 2 | 2 | 2 | 2 | 2 | 2 | 2 | 2 | 2 |
| | Vulcanization accelerator | 1 | 1 | 1 | 1 | 1 | 1 | 1 | 1 | 1 |
| Evaluation | Rolling resistance index | 103 | 94 | 100 | 97 | 91 | 103 | 99 | 96 | 95 |
| | Wet-grip performance index | 103 | 92 | 100 | 99 | 89 | 103 | 98 | 97 | 97 |
| | Abrasion resistance index | 106 | 112 | 100 | 97 | 108 | 104 | 97 | 96 | 95 |

Table 21 demonstrates that fuel economy, abrasion resistance, wet-grip performance, and heat aging resistance were markedly improved in the examples in which the highly purified natural rubber 9A or 9D was used.

<Rubber Composition for Studless Winter Tires>

The chemicals used in the examples are listed below.

Field latex: field latex available from MUHIBBAH LATEKS

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of ρ-cresol and dicyclopentadiene) available from ELIOKEM Emulvin W (surfactant): Emulvin W (aromatic polyglycol ether) available from LANXESS Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt

NR: TSR

BR: BR150B (cis content: 97% by mass, $ML_{1+4}$ (100° C.): 40, viscosity of 5% solution in toluene (25° C.): 48 cps, Mw/Mn: 3.3) available from Ube Industries, Ltd.

Carbon black: DIABLACK I (ISAF, $N_2SA$: 114 $m^2/g$, average particle size: 23 nm, DBP oil absorption: 114 mL/100 g) available from Mitsubishi Chemical Corporation Silica: Ultrasil VN3 ($N_2SA$: 175 $m^2/g$) available from Evonik Degussa Silane coupling agent: Si69 available from Evonik Degussa Oil: PS-32 (paraffinic process oil) available from Idemitsu Kosan Co., Ltd.

Wax: Ozoace wax available from Nippon Seiro Co., Ltd.

Zinc oxide: Zinc oxide #2 available from Mitsui Mining and Smelting Co., Ltd.

Stearic acid: stearic acid beads "Tsubaki" available from NOF Corporation

Antioxidant: Nocrac 6C (N-phenyl-N'-(1,3-dimethylbutyl)-p-phenylenediamine, 6PPD) available from Ouchi Shinko Chemical Industrial Co., Ltd.

Sulfur: powdered sulfur available from Tsurumi Chemical Industry Co., Ltd.

Vulcanization accelerator: Nocceler NS available from Ouchi Shinko Chemical Industrial Co., Ltd.

Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 10A

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5 to 5 mm. The coagulum was taken out and immersed in 1000 mL of a 2% by mass aqueous solution of sodium carbonate for 4 hours at room temperature, and then the rubber was taken out. The rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber (highly purified natural rubber 10A) was prepared.

Comparative Production Example 10B

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3 to 15 mm. The coagulum was taken out and immersed in 1000 mL of a 2% by mass aqueous solution of sodium carbonate for 4 hours at room temperature, and then the rubber was taken out. The rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber (highly purified natural rubber 10B) was prepared.

Comparative Production Example 10C

A solid rubber (highly purified natural rubber 10C) was prepared as in Production Example 10A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form the rubber into a sheet.

Production Example 10D

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for 4 hours at 90° C. In this manner, a solid rubber (highly purified natural rubber 10D) was prepared.

Comparative Production Example 10E

A commercially available high-ammonia latex having a solid rubber content of 62.0% available from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810, available from Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber (highly purified natural rubber 10E) was prepared.

Comparative Production Example 10F

A solid rubber (highly purified natural rubber 10F) was prepared as in Comparative Production Example 10E, except that, after the solidified rubber was taken out, it was immersed in a 0.5% by mass aqueous solution of sodium carbonate for 1 hour, and then the rubber was formed into a sheet using a creper while being washed with water, followed by drying for 4 hours at 90° C.

Table 22 shows the results of the above-described evaluations performed on the prepared solid rubbers.

<Fuel Economy (Rolling Resistance Properties)>

Rolling resistance was measured using a rolling resistance tester by running the test tire mounted on a 15×6 JJ rim at an internal pressure of 230 kPa, a load of 3.43 kN, and a speed of 80 km/h. The results are expressed as an index, with the value of Comparative Example 10-1 set equal to 100. A higher index indicates better fuel economy.

<Performance on Snow and Ice (Grip Performance on Ice)>

The performance of the test tires mounted on a vehicle on ice was evaluated under the following conditions. The test tires were mounted on a front-engine, rear-wheel-drive (FR) car of 2000 cc displacement, made in Japan. This test was performed in a test track (on ice) at the Asahikawa Tire Proving Ground of Sumitomo Rubber Industries, Ltd. in Hokkaido, Japan. The temperature on ice was −6° C. to −1° C.

TABLE 22

| | Saponified natural rubber | | | Deproteinized natural rubber | | | |
|---|---|---|---|---|---|---|---|
| | Highly purified natural rubber 10A Production Example 10A | Highly purified natural rubber 10B Comparative Production Example 10B | Highly purified natural rubber 10C Comparative Production Example 10C | Highly purified natural rubber 10D Production Example 10D | Highly purified natural rubber 10E Comparative Production Example 10E | Highly purified natural rubber 10F Comparative Production Example 10F | Natural rubber RSS #3 — |
| pH | 5 | 8 | 8.5 | 4.9 | 8.1 | 9.5 | — |
| Nitrogen content (% by mass) | 0.07 | 0.0.8 | 0.07 | 0.02 | 0.02 | 0.02 | 0.36 |
| Phosphorus content (ppm) | 92 | 89 | 93 | 108 | 93 | 95 | 590 |
| Gel content (% by mass) | 6 | 8 | 6 | 9 | 8 | 7 | 29.8 |
| Mooney viscosity | 58 | 59 | 60 | 58 | 60 | 60 | 88 |
| Heat aging resistance (%) | 95 | 60 | 41 | 85 | 58 | 28 | 103 |

Table 22 shows that the modified natural rubbers having a pH ranging from 2 to 7 were excellent in heat aging resistance as compared to the rubbers having a pH outside the range.

<Preparation of Vulcanized Rubber Composition and Test Tire>

According to the formulations shown in Table 23, the chemicals other than the sulfur and the vulcanization accelerator were kneaded using a 1.7-L Banbury mixer. Next, the sulfur and the vulcanization accelerator were kneaded with the kneaded mixture using a roll to prepare an unvulcanized rubber composition. The unvulcanized rubber composition was press-vulcanized for 12 minutes at 150° C. to prepare a vulcanized composition. The kneading process was carried out using 10 times the amount of the rubber obtained in each of the production examples or comparative production examples.

Separately, the unvulcanized rubber composition was formed into the shape of a tread and assembled with other tire components on a tire building machine to build an unvulcanized tire, which was then vulcanized at 170° C. for 12 minutes to prepare a test tire (size: 195/65R15, a studless winter tire for passenger vehicles).

The thus prepared vulcanized rubber compositions and test tires were evaluated as follows. Table 23 shows the results.

Braking performance (Breaking distance on ice): The stopping distance on ice was measured which was the distance required to stop after the brakes that lock up were applied at 30 km/h. The results are expressed as an index calculated using the equation below, wherein the value of Comparative Example 10-1 is set equal to 100. A higher index indicates better braking performance on ice.

(Index of grip on ice)=(Stopping distance of Comparative Example 10-1)/(Stopping distance of each formulation)×100

<Abrasion Resistance>

Vulcanized rubber samples for Lambourn abrasion testing prepared from the vulcanized rubber compositions were abraded using a Lambourn abrasion tester under a load of 1.0 kg at a temperature of 20° C., a slip ratio of 30%, and a measurement time of 2 minutes, and then measured for Lambourn abrasion loss. The volume losses of the formulations were calculated and expressed as an abrasion resistance index calculated using the equation below, wherein the value of Comparative Example 10-1 is set equal to 100. A higher abrasion resistance index indicates better abrasion resistance.

(Abrasion resistance index)=(Volume loss of Comparative Example 10-1)/(Volume loss of each formulation)×100

TABLE 23

| Rubber composition for studless winter tires | | | | | | | | | | | |
|---|---|---|---|---|---|---|---|---|---|---|---|
| | | Saponified natural rubber | | | | | | Deproteinized natural rubber | | | Natural rubber |
| | | Example | | | Comparative Example | | | Example | Comparative Example | | Comparative Example |
| | | 10-1 | 10-2 | 10-3 | 10-1 | 10-2 | 10-3 | 10-4 | 10-4 | 10-5 | 10-6 |
| Formulation (parts by mass) | Highly purified natural rubber 10A | 60 | 60 | 60 | — | — | — | — | — | — | — |
| | Highly purified natural rubber 10B | — | — | — | 60 | — | 60 | — | — | — | — |
| | Highly purified natural rubber 10C | — | — | — | — | 60 | — | — | — | — | — |
| | Highly purified natural rubber 10D | — | — | — | — | — | — | 60 | — | — | — |
| | Highly purified natural rubber 10E | — | — | — | — | — | — | — | 60 | — | — |
| | Highly purified natural rubber 10F | — | — | — | — | — | — | — | — | 60 | — |
| | NR | — | — | — | — | — | — | — | — | — | 60 |
| | BR | 40 | 40 | 40 | 40 | 40 | 40 | 40 | 40 | 40 | 40 |
| | Carbon black | 10 | 10 | 50 | 10 | 10 | 50 | 10 | 10 | 10 | 10 |
| | Silica | 60 | 100 | 10 | 60 | 60 | 10 | 60 | 60 | 60 | 60 |
| | Silane coupling agent | 4 | 4 | 1 | 4 | 4 | 1 | 4 | 4 | 4 | 4 |
| | Stearic acid | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 |
| | Antioxidant | 1.5 | 1.5 | 1.5 | 1.5 | 1.5 | 1.5 | 1.5 | 1.5 | 1.5 | 1.5 |
| | Wax | 1.5 | 1.5 | 1.5 | 1.5 | 1.5 | 1.5 | 1.5 | 1.5 | 1.5 | 1.5 |
| | Oil | 20 | 20 | 20 | 20 | 20 | 20 | 20 | 20 | 20 | 20 |
| | Sulfur | 2 | 2 | 2 | 2 | 2 | 2 | 2 | 2 | 2 | 2 |
| | Vulcanization accelerator | 1 | 1 | 1 | 1 | 1 | 1 | 1 | 1 | 1 | 1 |
| Evaluation | Rolling resistance index | 105 | 107 | 98 | 100 | 97 | 92 | 103 | 97 | 96 | 94 |
| | Index of performance on snow and ice | 103 | 104 | 97 | 100 | 99 | 90 | 102 | 98 | 98 | 98 |
| | Abrasion resistance index | 104 | 106 | 109 | 100 | 99 | 104 | 103 | 98 | 97 | 101 |

Table 23 demonstrates that the balance of performance on snow and ice, fuel economy, heat aging resistance, and abrasion resistance was markedly improved in the examples in which the highly purified natural rubber 10A or 10D was used.

The foregoing results prove that pneumatic tires including tire components each containing a highly purified natural rubber with a pH of 2 to 7 and a specific compounding agent(s), and studless winter tires formed from a rubber composition for studless winter tires that contains a highly purified natural rubber with a pH of 2 to 7 and a specific compounding agent achieve a balanced improvement in fuel economy, heat aging resistance, and the above-described properties.

The invention claimed is:

1. A pneumatic tire, comprising at least one component selected from the group consisting of a sidewall, a base tread, a bead apex, a clinch apex, an innerliner, and an undertread, each of which is formed from a rubber composition that comprises a modified natural rubber whose pH is adjusted to 2 to 7, wherein the modified natural rubber has a phosphorus content of 200 ppm or less, and at least one of carbon black or a white filler.

2. A pneumatic tire, comprising at least one of a breaker topping or a ply topping, each of which is formed from a rubber composition that comprises a modified natural rubber whose pH is adjusted to 2 to 7, wherein the modified natural rubber has a phosphorus content of 200 ppm or less, and carbon black.

3. A pneumatic tire, comprising a tread, the tread being formed from a rubber composition that comprises a modified natural rubber whose pH is adjusted to 2 to 7, wherein the modified natural rubber has a phosphorus content of 200 ppm or less, styrene-butadiene rubber, and a white filler.

4. The pneumatic tire according to claim 1, wherein the modified natural rubber is obtained by removing non-rubber components in natural rubber, followed by treatment with an acidic compound, and the modified natural rubber has a pH of 2 to 7.

5. The pneumatic tire according to claim 1, wherein the modified natural rubber is obtained by washing a saponified natural rubber latex and treating the washed saponified natural rubber latex with an acidic compound, and the modified natural rubber has a pH of 2 to 7.

6. The pneumatic tire according to claim 1, wherein the modified natural rubber is obtained by washing a deproteinized natural rubber latex and treating the washed deproteinized natural rubber latex with an acidic compound, and the modified natural rubber has a pH of 2 to 7.

7. The pneumatic tire according to claim 1, wherein the modified natural rubber has a nitrogen content of 0.15% by mass or less.

8. The pneumatic tire according to claim 1, wherein the modified natural rubber has a heat aging resistance index of 75 to 120%, the heat aging resistance index being defined by the following equation based on Mooney viscosities ML (1+4) at 130° C. measured in conformity with JIS K 6300: 2001-1:

Heat aging resistance index (%)=(Mooney viscosity of the modified natural rubber measured after heat treatment at 80° C. for 18 hours)/(Mooney viscosity of the modified natural rubber before the heat treatment)×100.

9. A method for producing the pneumatic tire according to claim 1, comprising:

step 1-1 of saponifying natural rubber latex;

step 1-2 of coagulating the saponified natural rubber latex obtained in step 1-1, treating the coagulated rubber with a basic compound, and washing the treated coagulated rubber;

step 1-3 of treating the washed coagulated rubber with an acidic compound to adjust the pH of the entire rubber to 2 to 7; and step 1-4 of kneading the modified natural rubber obtained in step 1-3.

10. A method for producing the pneumatic tire according to claim 1, comprising:

step 2-1 of deproteinizing natural rubber latex;

step 2-2 of coagulating the deproteinized natural rubber latex obtained in step 2-1, and washing the coagulated rubber;

step 2-3 of treating the washed coagulated rubber with an acidic compound to adjust the pH of the entire rubber to 2 to 7; and step 2-4 of kneading the modified natural rubber obtained in step 2-3.

11. A studless winter tire, formed from a rubber composition that comprises a modified natural rubber whose pH is adjusted to 2 to 7, wherein the modified natural rubber has a phosphorus content of 200 ppm or less, and at least one of carbon black or a white filler.

12. The studless winter tire according to claim 11, wherein the modified natural rubber is obtained by removing non-rubber components in natural rubber, followed by treatment with an acidic compound, and the modified natural rubber has a pH of 2 to 7.

13. The studless winter tire according to claim 11, wherein the modified natural rubber is obtained by washing a saponified natural rubber latex and treating the washed saponified natural rubber latex with an acidic compound, and the modified natural rubber has a pH of 2 to 7.

14. The studless winter tire according to claim 11, wherein the modified natural rubber is obtained by washing a deproteinized natural rubber latex and treating the washed deproteinized natural rubber latex with an acidic compound, and the modified natural rubber has a pH of 2 to 7.

* * * * *